United States Patent
Ramaswami et al.

(10) Patent No.: US 6,597,826 B1
(45) Date of Patent: Jul. 22, 2003

(54) OPTICAL CROSS-CONNECT SWITCHING SYSTEM WITH BRIDGING, TEST ACCESS AND REDUNDANCY

(75) Inventors: Rajiv Ramaswami, Sunnyvale, CA (US); Steven Clark, Palo Alto, CA (US); Robert R. Ward, Sunnyvale, CA (US)

(73) Assignee: XROS, Inc., Santa Clara, CA (US)

( * ) Notice: Subject to any disclaimer, the term of this patent is extended or adjusted under 35 U.S.C. 154(b) by 0 days.

(21) Appl. No.: 09/704,444

(22) Filed: Nov. 1, 2000

Related U.S. Application Data

(60) Provisional application No. 60/162,936, filed on Nov. 2, 1999, provisional application No. 60/170,094, filed on Dec. 10, 1999, provisional application No. 60/170,095, filed on Dec. 10, 1999, provisional application No. 60/170,093, filed on Dec. 10, 1999, provisional application No. 60/170,092, filed on Dec. 10, 1999, provisional application No. 60/186,108, filed on Mar. 1, 2000, and provisional application No. 60/200,425, filed on Apr. 28, 2000.

(51) Int. Cl.[7] .................................................. G02B 6/42

(52) U.S. Cl. ............................ 385/17; 385/15; 385/16; 385/24

(58) Field of Search ........................... 385/17, 15–24, 385/88, 36

(56) References Cited

U.S. PATENT DOCUMENTS

| | | | |
|---|---|---|---|
| 3,651,392 A | 3/1972 | Frisch et al. | 318/561 |
| 4,365,863 A | 12/1982 | Broussaud | |
| 4,369,523 A | 1/1983 | Seki et al. | |
| 4,437,190 A | 3/1984 | Rozenwaig et al. | 455/600 |
| 4,470,154 A | 9/1984 | Yano | 455/607 |

(List continued on next page.)

FOREIGN PATENT DOCUMENTS

| | | |
|---|---|---|
| EP | 0 857 000 A3 | 8/1990 |
| EP | 0 674 457 A2 | 9/1995 |
| EP | A-0 674 457 | 9/1995 |
| EP | 0721275 A2 | 12/1995 |
| EP | 0752794 A2 | 1/1997 |

(List continued on next page.)

OTHER PUBLICATIONS

Okamoto, S. et al.; "Optical Path Cross–Connect Node Architectures for Photonic Transport Network", Journal of Lightwave Technology, vol. 14, No. 6, Jun. 1996, pp. 1410–1422.

Lin, L.Y. et al.; "Micro–Electro–Mechanical Systems (MEMS) for WDM Optical–Crossconnect Networks", Milcom 1999; IEEE Miltary Communications Conf Proceedings; Atlantic City, NJ Oct. 31–Nov. 3, 1999; pp. 954–957.

A. Himeno, R. Nagase, T. Ito, K. Kato and M. Okuno; Photonic Inter–Module Connector Using 8x8 Optical Switches for Near–Future Electronic Switching Systems. IEICE Transactions on Communications; E77–B(Feb. 1994), No. 2, Tokyo, JP.

(List continued on next page.)

Primary Examiner—Phan T. H. Palmer
(74) Attorney, Agent, or Firm—Blakely Sokoloff Taylor & Zafman LLP

(57) ABSTRACT

In one embodiment, a scalable cross-connect switching system and its corresponding method perform a bridging operation by splitting the incoming light signal into at least a first bridged light signal and a second bridged light signal. The first bridged light signal has a power level equal to or substantially greater than a power level of the second bridged light signal. The disproportionate power levels provide low-loss bridging. Light signals based on these bridged light signals are routed through multiple switch fabrics which provide redundancy in case of failure by switching within the switch fabric. To detect failures, a test access port is configured for monitoring multiple optical paths.

16 Claims, 27 Drawing Sheets

U.S. PATENT DOCUMENTS

| | | | |
|---|---|---|---|
| 4,519,670 A | 5/1985 | Spinner et al. | 350/96.15 |
| 4,530,566 A | 7/1985 | Smith et al. | 350/96.2 |
| 4,563,774 A | 1/1986 | Gloge | |
| 4,580,873 A | 4/1986 | Levinson | |
| 4,612,670 A | 9/1986 | Henderson | 455/607 |
| 4,634,239 A | 1/1987 | Buhrer | 350/486 |
| 4,797,879 A | 1/1989 | Habbab et al. | |
| 4,817,014 A | 3/1989 | Schneider et al. | |
| 4,843,382 A | 6/1989 | Oda et al. | |
| 4,856,863 A | 8/1989 | Sampsell et al. | |
| 4,859,012 A | 8/1989 | Cohn | |
| 4,886,335 A | 12/1989 | Yanagawa et al. | |
| 4,897,830 A | 1/1990 | Hill et al. | 370/4 |
| 4,903,225 A | 2/1990 | Brost | |
| 4,982,446 A | 1/1991 | Lord et al. | 455/606 |
| 4,984,238 A | 1/1991 | Watanabe et al. | |
| 5,035,482 A | 7/1991 | Ten Berge et al. | 350/96.2 |
| 5,037,173 A | 8/1991 | Sampsell et al. | |
| 5,157,652 A | 10/1992 | Walker | 370/17 |
| 5,216,729 A | 6/1993 | Berger et al. | |
| 5,253,274 A | 10/1993 | Janniello et al. | 375/121 |
| 5,260,819 A | 11/1993 | Hadjifotiou et al. | |
| 5,272,556 A | 12/1993 | Faulkner et al. | 359/125 |
| 5,299,044 A | 3/1994 | Mosch et al. | 359/110 |
| 5,349,550 A | 9/1994 | Gage | |
| 5,355,238 A | 10/1994 | Kight et al. | 359/135 |
| 5,359,683 A | 10/1994 | Pan | |
| 5,440,654 A | 8/1995 | Lambert, Jr. | |
| 5,477,364 A | 12/1995 | Pearson | 359/139 |
| 5,485,300 A | 1/1996 | Daley | 359/180 |
| 5,487,120 A | 1/1996 | Choy et al. | 385/24 |
| 5,488,862 A | 2/1996 | Neukermans et al. | |
| 5,515,361 A | 5/1996 | Li et al. | 370/15 |
| 5,521,732 A | 5/1996 | Nishio | 359/120 |
| 5,521,734 A | 5/1996 | Frigo | 359/152 |
| 5,524,153 A | 6/1996 | Laor | |
| 5,535,293 A | 7/1996 | Buchin | |
| 5,539,328 A | 7/1996 | Mirov et al. | |
| 5,570,371 A | 10/1996 | Iga | 370/99 |
| 5,608,735 A | 3/1997 | McCullough et al. | |
| 5,629,790 A | 5/1997 | Neukermans et al. | |
| 5,629,919 A | 5/1997 | Hayashi et al. | 369/112 |
| 5,648,618 A | 7/1997 | Neukermans et al. | |
| 5,666,487 A | 9/1997 | Goodman et al. | |
| 5,694,389 A | 12/1997 | Seki et al. | |
| 5,699,463 A | 12/1997 | Yang et al. | |
| 5,719,903 A | 2/1998 | Hiben et al. | |
| 5,727,098 A | 3/1998 | Jacobson | |
| 5,729,527 A | 3/1998 | Gerstel et al. | 370/228 |
| 5,745,274 A | 4/1998 | Fatehi et al. | 359/187 |
| 5,774,604 A | 6/1998 | McDonald | |
| 5,781,537 A | 7/1998 | Ramaswami et al. | 370/254 |
| 5,793,746 A | 8/1998 | Gerstel et al. | 370/228 |
| 5,801,863 A | 9/1998 | Fatehi et al. | 359/124 |
| 5,825,877 A | 10/1998 | Dan et al. | 380/4 |
| 5,825,949 A | 10/1998 | Choy et al. | 385/24 |
| 5,828,476 A | 10/1998 | Bonebright et al. | |
| 5,864,643 A | 1/1999 | Pan | |
| 5,867,289 A | 2/1999 | Gerstel et al. | 359/110 |
| 5,892,606 A | 4/1999 | Fatehi et al. | 359/177 |
| 5,900,968 A | 5/1999 | Srivastava et al. | 359/341 |
| 5,903,687 A | 5/1999 | Young et al. | |
| 5,915,063 A | 6/1999 | Colbourne et al. | |
| 5,942,937 A | 8/1999 | Bell | |
| 5,960,132 A | 9/1999 | Lin | |
| 5,963,350 A | 10/1999 | Hill | 359/127 |
| 5,970,201 A | * 10/1999 | Anthony et al. | 385/16 |
| 5,978,113 A | 11/1999 | Kight | 359/110 |
| 6,002,818 A | 12/1999 | Fatehi et al. | 385/17 |
| 6,005,993 A | 12/1999 | MacDonald | 385/16 |
| 6,008,915 A | 12/1999 | Zyskind | 359/110 |
| 6,009,220 A | 12/1999 | Chan et al. | 385/24 |
| 6,046,833 A | 4/2000 | Sharma et al. | 359/119 |
| 6,047,331 A | 4/2000 | Medard et al. | 709/239 |
| 6,061,482 A | 5/2000 | Davis | 385/17 |
| 6,069,924 A | 5/2000 | Sudo et al. | |
| 6,072,612 A | 6/2000 | Liou et al. | 359/123 |
| 6,081,361 A | 6/2000 | Adams et al. | 359/188 |
| 6,097,858 A | 8/2000 | Laor | |
| 6,097,859 A | 8/2000 | Solgaard et al. | |
| 6,108,311 A | 8/2000 | Ramaswami et al. | 370/258 |
| 6,130,876 A | 10/2000 | Chaudhuri | |
| 6,147,968 A | 11/2000 | De Moer et al. | 370/225 |
| 6,148,124 A | 11/2000 | Aksyuk et al. | 385/24 |
| 6,160,821 A | 12/2000 | Dölle et al. | |
| 6,185,021 B1 | 2/2001 | Fatehi et al. | |
| 6,188,810 B1 | 2/2001 | Orlowski et al. | 385/11 |
| 6,188,814 B1 | 2/2001 | Bhalla | |
| 6,192,172 B1 | 2/2001 | Fatehi et al. | |
| 6,195,402 B1 | 2/2001 | Hiramatsu | |
| 6,198,571 B1 | 3/2001 | Yang | 359/337 |
| 6,207,949 B1 | 3/2001 | Jackel | 250/227 |
| 6,222,954 B1 | 4/2001 | Riza | |
| 6,252,689 B1 | 6/2001 | Sharp | |
| 6,253,001 B1 | 6/2001 | Hoen | |
| 6,272,154 B1 | 8/2001 | Bala et al. | |
| 6,285,809 B1 | 9/2001 | Nir et al. | |
| 6,295,154 B1 | 9/2001 | Laor et al. | |
| 6,301,402 B1 | 10/2001 | Bhalla et al. | |
| 6,317,530 B1 | 11/2001 | Ford | |
| 6,374,008 B2 | 4/2002 | Solgaard et al. | |
| 6,392,220 B1 | 5/2002 | Slater et al. | |
| 6,400,730 B1 | 6/2002 | Latif et al. | |

FOREIGN PATENT DOCUMENTS

| | | |
|---|---|---|
| EP | 0759681 A2 | 2/1997 |
| EP | 0809384 A2 | 5/1997 |
| EP | 0 802 697 A2 | 10/1997 |
| EP | 0857000 A2 | 1/1998 |
| EP | 0 674 457 A3 | 5/1998 |
| EP | 0 849 906 A2 | 6/1998 |
| EP | A-0 849 906 | 6/1998 |
| EP | A-0 857 000 | 8/1998 |
| EP | 0938244 A2 | 1/1999 |
| EP | 0 898 440 A2 | 2/1999 |
| EP | 0910138 A1 | 4/1999 |
| EP | 0932069 A1 | 7/1999 |
| EP | A-0 938 244 | 8/1999 |
| EP | 0953854 A1 | 11/1999 |
| EP | 0994635 A1 | 4/2000 |
| EP | 1087556 A1 | 3/2001 |
| GB | 2347570 A | 3/1999 |
| WO | WO86/04205 | 7/1986 |
| WO | WO86/05649 | 9/1986 |
| WO | WO90/14734 | 11/1990 |
| WO | WO91/01603 | 2/1991 |
| WO | WO95/19689 | 7/1995 |
| WO | WO97/24822 | 7/1997 |
| WO | WO98/54863 | 5/1998 |
| WO | WO99/13656 | 3/1999 |
| WO | WO 99/18751 | 4/1999 |
| WO | WO 99 40738 A | 8/1999 |
| WO | WO00/13210 | 9/1999 |
| WO | WO99/48323 | 9/1999 |
| WO | WO99/59272 | 11/1999 |
| WO | WO9963374 | 12/1999 |
| WO | WO9963531 | 12/1999 |
| WO | WO9966354 | 12/1999 |
| WO | WO9967666 | 12/1999 |
| WO | WO0004671 | 1/2000 |
| WO | WO0013210 A2 | 3/2000 |

| | | |
|---|---|---|
| WO | WO0013210 A3 | 3/2000 |
| WO | WO0020899 A2 | 4/2000 |
| WO | WO0020899 A3 | 4/2000 |
| WO | WO00/20899 | 4/2000 |
| WO | WO00/52865 | 9/2000 |
| WO | WO 0007945 A1 | 2/2001 |
| WO | WO01/28136 A1 | 4/2001 |
| WO | WO0150176 A1 | 7/2001 |
| WO | WO0163803 A1 | 8/2001 |
| WO | WO0171402 | 9/2001 |
| WO | WO00/30282 | 5/2002 |

OTHER PUBLICATIONS

Types and Characteristics of SDH Network Protection Architectures; ITU–T Recommendation G.841 (10/98).

Optical Networks: A Practical Perspective; Rajiv Ramaswami & Kumar Sivarajan; Morgan Kaufmann Pub. 1998, pp. 152–161.

Optical Networks: A Practical Perspective; Rajiv Ramaswami & Kumar Sivarajan; Morgan Kaufmann Pub. 1998, Chapter 10, pp. 423–462.

The Photonic Switch Completes the Much–Vaunted All–Optical Network, Technology Investor, Chad White, Oct. 2000, pp. 28–31.

Operation and Maintenance for an All–Optical Transport Network, Bischoff, et al., 11/96, IEEE Communications Magazine, pp. 136–142.

Free–Space Micromachined Optical Switches with Submillisecond Switching Time for Large–Scale Optical Crossconnects, Lin, et al., 04/98, pp. 525–527.

The Optical Internet A New Network Architecture, Kaufman, et al., pp. 1–13.

All Optical Regeneration, Simon et al., 2000 IEEE pp. 53–54.

An Economic Analysis for Core Optical Transport Networks, Peter Wong & Mark Yin.

Experimental Study of Internet Stability and Backbone Failures, Craig Labovitz, Abha Ahuja, Farnam Jahanaian, 1999 IEEE, pp. 278–285.

Gustaffson, K. & Hok, B., A Batch–Processed Optical Scanner Proc. 12th Nordic Semiconductor, Meeting, Jevnaker (Oslo: Center for Industrial Research) pp. 282–285 (1986).

Gustaffson, K. & Hok, B., Fiberoptic Switching and Multiplexing with a Micromechanical Scanning Mirror, Digest of Technical Papers 4th Int. Conf. on Solid State Sensors and Actuators (Tokyo: Institute of Electrical Engineers of Japan) pp. 212–215 (1987).

Gustaffson, K. & Hok, B., a Silicon Light Modulator, Journal of Physics E, Scientic Instruments 21, pp. 608–615 (1998).

Lin L.Y., et al., Free–Space Micromachined Optical–Switching Technologies and Architectures, OFC/100C '99, Feb. 21–26, 1999.

Lin, L.Y., et al., Free–Space Micromachined Optical–Switching Technologies and Architectures, OFC/100C '99, Feb. 21–26, 1999.

Laor, H., et al., Performance of a 576 × 576 optical cross connect, NFOEC–99.

* cited by examiner

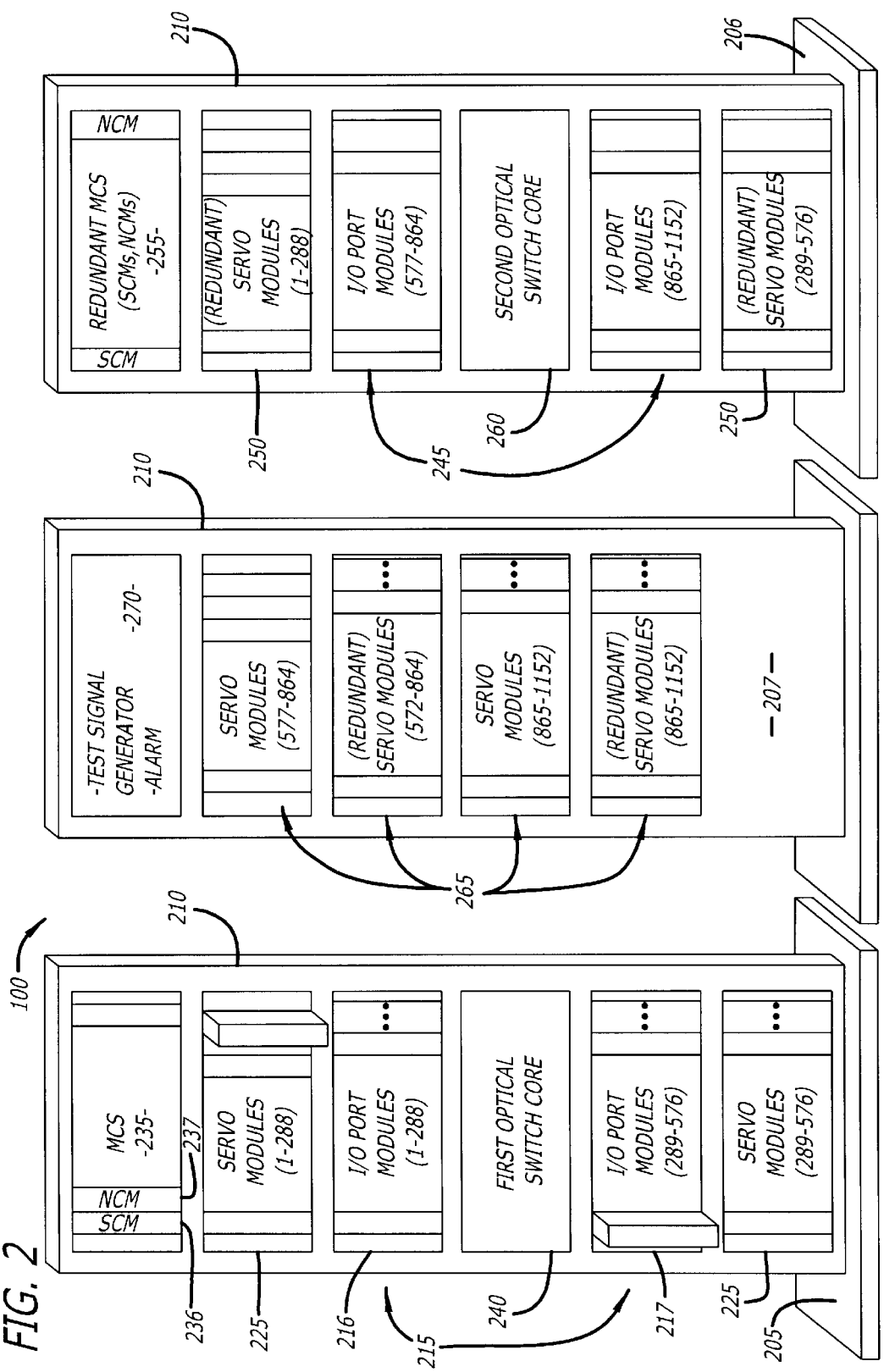

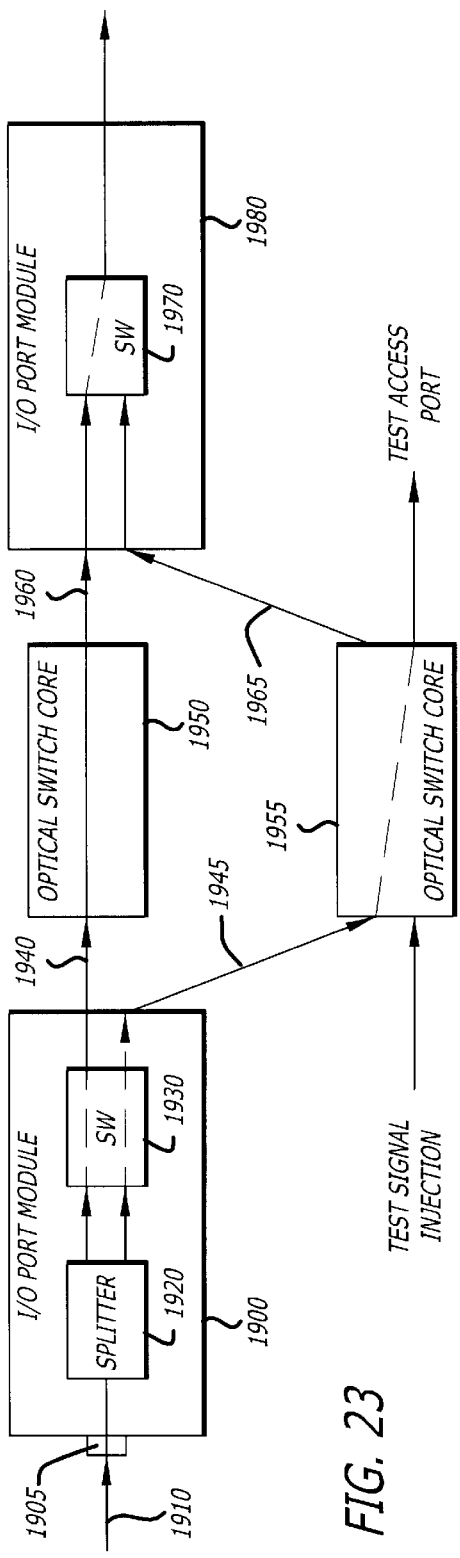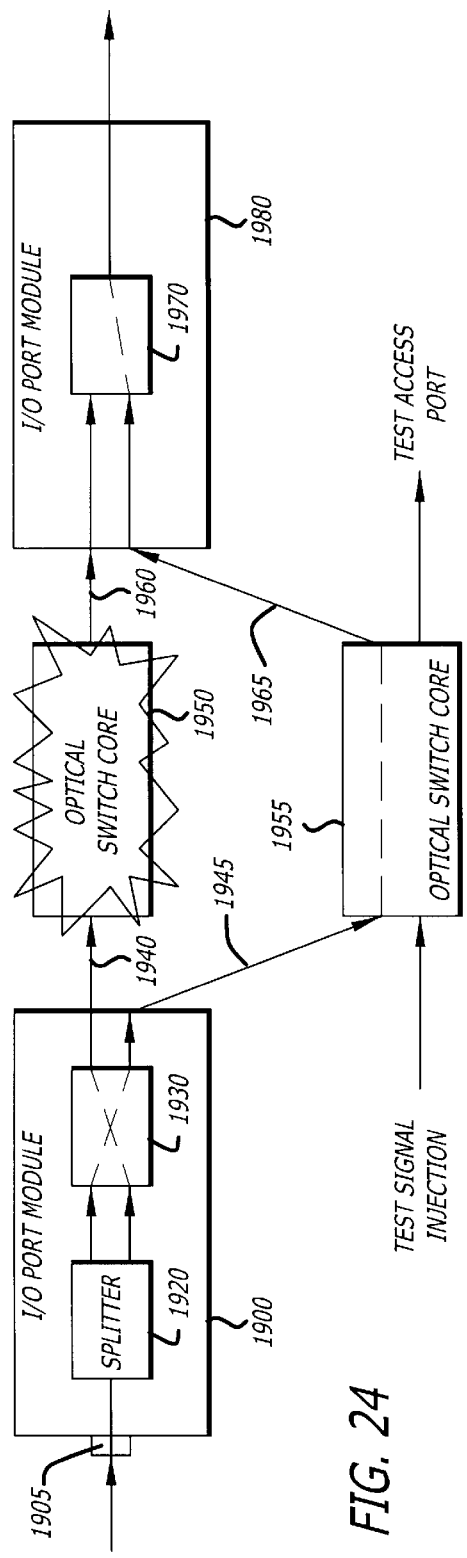
FIG. 23
FIG. 24

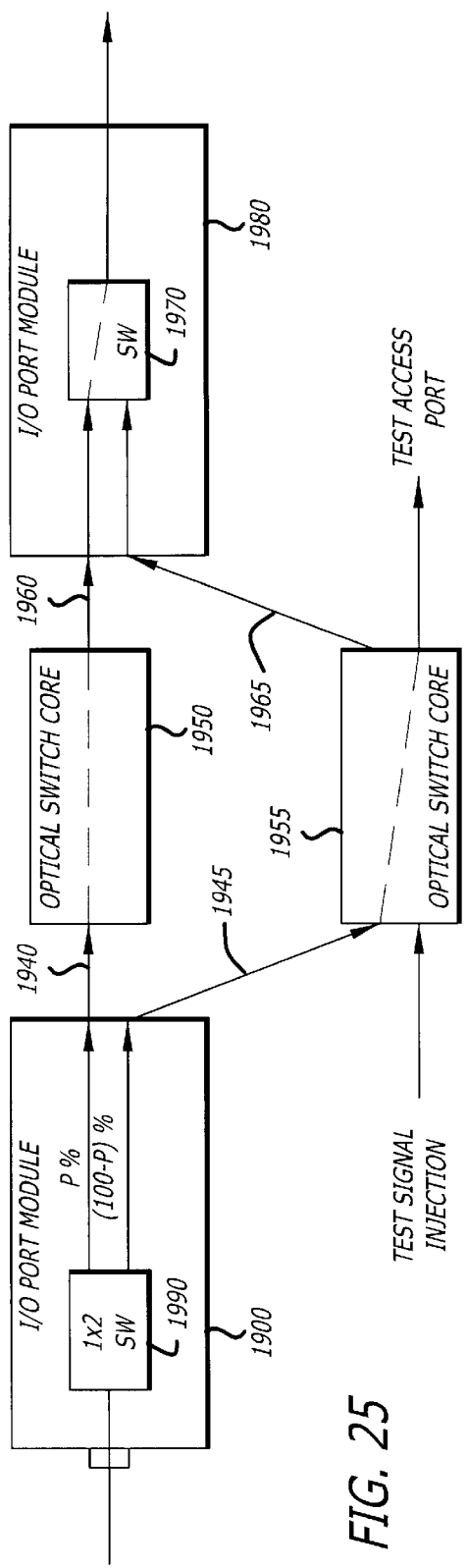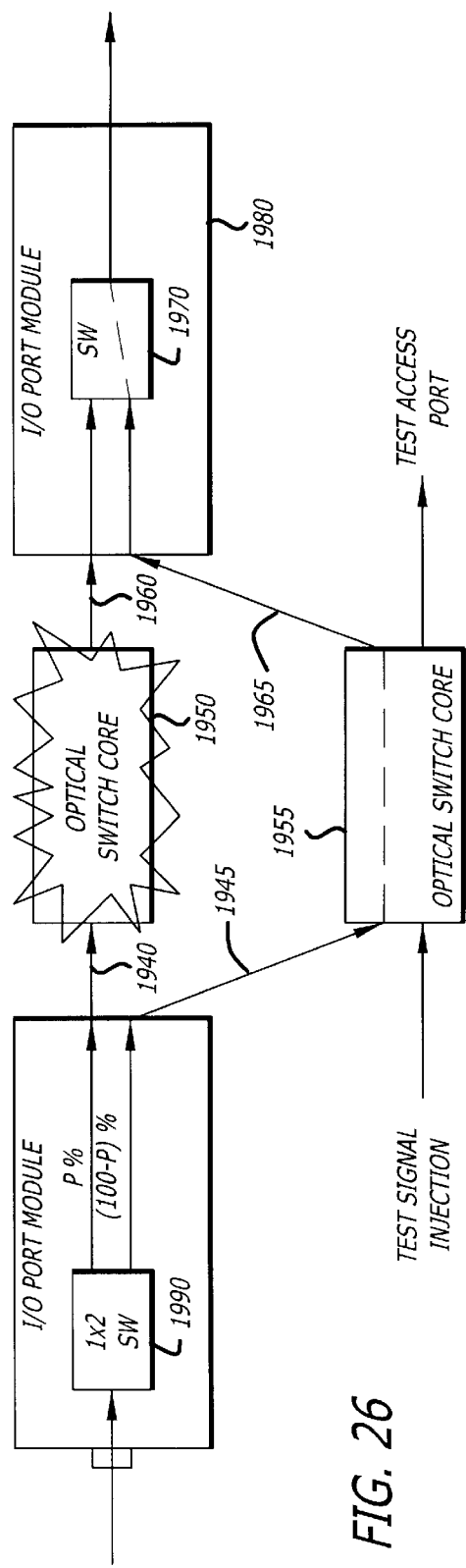

OPTICAL CROSS-CONNECT SWITCHING SYSTEM WITH BRIDGING, TEST ACCESS AND REDUNDANCY

CROSS REFERENCE TO RELATED APPLICATIONS

This non-provisional U.S. Patent Application claims the benefit of U.S. Provisional Patent Application No. 60/162,936 entitled "OPTICAL CROSSCONNECT WITH OPTICAL TO ELECTRICAL CONVERTERS" filed on Nov. 2, 1999 by inventor Rajiv Ramaswami; and also claims the benefit of U.S. Provisional Patent Application No. 60/170,094 entitled "OPTICAL CROSSCONNECT WITH BRIDGING, TEST ACCESS AND REDUNDANCY" filed on Dec. 10, 1999 by inventors Rajiv Ramaswami and Robert R. Ward; and also claims the benefit of U.S. Provisional Patent Application No. 60/170,095 entitled "OPTICAL CROSSCONNECT WITH LOW-LOSS BRIDGING, TEST ACCESS AND REDUNDANCY" filed on Dec. 10, 1999 by inventors Steven Clark and Rajiv Ramaswami; and also claims the benefit of U.S. Provisional Patent Application No. 60/170,093 entitled "1+1 OPTICAL PROTECTION USING OPTICAL CROSSCONNECT" filed on Dec. 10, 1999 by inventors Rajiv Ramaswami and Robert R. Ward; and also claims the benefit of U.S. Provisional Patent Application No. 60/170,092 entitled "SIGNALING INTERFACE BETWEEN OPTICAL CROSSCONNECT AND ATTACHED EQUIPMENT" filed on Dec. 10, 1999 by inventor Rajiv Ramaswami; and also claims the benefit of U.S. Provisional Patent Application No. 60/186,108 entitled "1:N PROTECTION BETWEEN CLIENTS AND ALL-OPTICAL CROSSCONNECTS" filed on Mar. 1, 2000 by inventors Kent Erickson, Subhashini Kaligotla, and Rajiv Ramaswami; and also claims the benefit of U.S. Provisional Patent Application No. 60/200,425 entitled "OPTICAL CROSSCONNECT SYSTEM" filed on Apr. 28, 2000 by inventors Rajiv Ramaswami, Steve Tabaska, and Robert Ward.

GENERAL BACKGROUND

Over the last few years, the demand for high-speed communication networks has increased dramatically. In many situations, communication networks are implemented with electrical interconnections. As desired levels of bandwidth and transmission speed for communication networks increase, it will become more and more difficult for electrical interconnections to satisfy these levels.

Optical fiber offers a solution to the difficulties affecting conventional electrical interconnections. For example, optical fiber is less susceptible to inductive or even capacitive coupling effects as electrical interconnections. In addition, optical fiber offers increased bandwidth and substantial avoidance of electromagnetic interference. The potential advantages of optical fiber becomes more important as the transmission rates increase.

Albeit local or global in nature, many communication networks feature hybrid, optical-electrical semiconductor circuits that employ photodetectors, electrical switches, optical modulators and/or lasers. To handle greater data traffic, an alternative approach has been to employ an optical cross-connect switch, which performs switching operations of light pulses or photons (referred to generally as "light signals") without the need for converting and reconverting signals between the optical domain to the electrical domain. However, conventional optical cross-connect switches are still subject to a wide variety of disadvantages.

One disadvantage is that traditional optical cross-connect switches may not offer any protective features against damage to the optical fiber (facility protection) and against equipment failures, namely failures within the optical cross-connect switch itself. One protective feature may be redundancy. Moreover, traditional optical cross-connect switches do not provide one or more of the following: (1) test access capability to non-intrusively monitor the light signals passing through the cross-connect as well as performance monitoring of these light signals; (2) automatic determination of the topology of the communication network; or (3) low-loss bridging capabilities as described below.

SUMMARY

In general, one embodiment of the present invention relates to a scalable cross-connect switching system and its corresponding method of performing a bridging operation by splitting the incoming light signal into at least a first bridged light signal and a second bridged light signal. The first bridged light signal has a power level equal to or substantially greater than a power level of the second bridged light signal. The disproportionate power levels provide low-loss bridging. Light signals based on these bridged light signals are routed through multiple switch fabrics, which provide redundancy in case of failure by switching within the switch fabric. To detect failures, a test access port may be configured for monitoring multiple optical paths through an optical-to-electrical (O/E) conversion and monitoring device in lieu of test access ports for assigned for each I/O port.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which:

FIG. 2 is a first exemplary embodiment of an optical cross-connect switching system of FIG. 1.

FIG. 23 is a first exemplary embodiment of a low-loss bridging technique utilized by a first I/O port module under normal operating conditions.

FIG. 24 is an exemplary embodiment of the low-loss bridging technique of FIG. 23 upon failure of an optical switch.

FIG. 25 is a second exemplary embodiment of a low-loss bridging technique utilized by a first I/O port module under normal operating conditions.

FIG. 26 is an exemplary embodiment of the low-loss bridging technique of FIG. 25 upon failure of an optical switch.

DETAILED DESCRIPTION

Herein, the exemplary embodiments of the present invention relate to a scalable, optical cross-connect switching system and associated techniques to perform bridging and test access functionality in order to protect against facility and equipment failures. The described embodiments should not limit the scope of the present invention, but rather are intended to provide a thorough understanding of the present invention. Certain well-known circuits are not set forth in detail in order to avoid unnecessarily obscuring the present invention.

In the following description, certain terminology is used to describe various features of the present invention. For example, a "module" includes a substrate normally formed with any type of material or materials upon which components can be attached such as a printed circuit board or a daughter card for example. Examples of a "component" include an optical switch, a processing unit (e.g., Field Programmable Gate Array "FPGA", digital signal processor, general microprocessor, application specific integrated circuit "ASIC", etc.), splitters and the like. A "splitter" is an optical component that performs a bridging operation on an input light signal by splitting that light signal into two or more output light signals. Each module features one or more interfaces to transport information over a link. A "link" is broadly defined as one or more physical or virtual information-carrying mediums that establish a communication pathway such as, for example, optical fiber, electrical wire, cable, bus traces, wireless channels and the like. "Information" can be voice, data, address, and/or control in any representative signaling format such as light signals (e.g., light pulses or photons).

I General Architectural Overview

Figure 1:
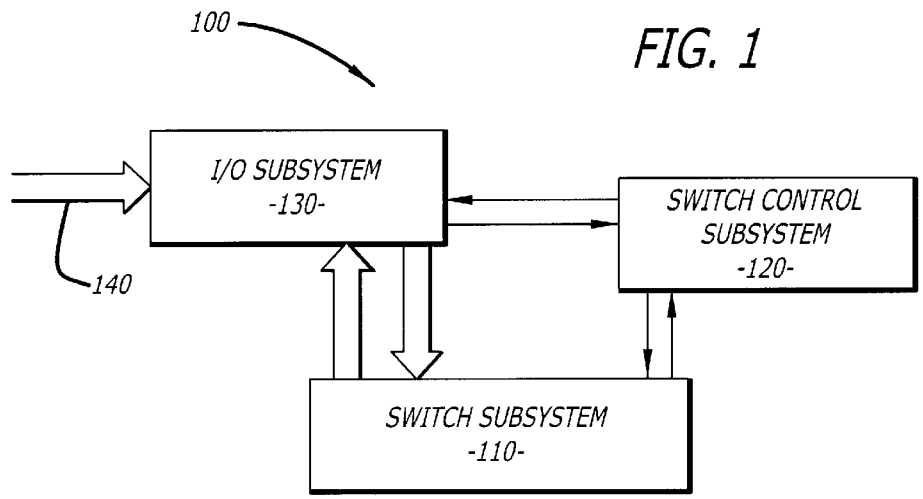
FIG. 1 is a simplified overview of an exemplary embodiment of an optical cross-connect switching system.

Referring to FIG. 1, an exemplary embodiment of a simplified overview of an optical cross-connect switching system 100 is shown. Herein, the optical cross-connect switching system 100 comprises three basic units: a switch subsystem 110, a switch control subsystem 120 and an input/output (I/O) subsystem 130. In one embodiment, the modular architecture of the switch subsystem 110, by a method of having replaceable optical switch cores, provides for switch subsystem maintenance in the event of failure within the switch subsystem 110. It is conceivable that further modularity could be achieved by having replaceable subsections within, thus providing for switch matrix maintenance in the event of failure within a switch matrix itself. The modular architecture of both the switch control subsystem 120 and the I/O subsystem 130, each handling a small number of I/O ports in the system 100, provides scalability to the optical cross-connect switching system 100. Thus, additional I/O ports may be subsequently added to the optical cross-connect switching system 100 by adding or removing input/output (I/O) port modules (described below).

The switch subsystem 110 includes optical switches for routing light signals. In one embodiment, the optical switches forming the switch subsystem 110 are micro-machined mirrors; however, it is contemplated that other switch fabrics may be used such as liquid crystal technology. The I/O subsystem 130 receives external light signals 140 and transfers these signals to the switch subsystem 110. The switch control subsystem 120 controls the configuration of the switch subsystem 110 (e.g., mirror orientation) and performs certain monitoring functions. The interconnectivity between the switch subsystem 110, the switch control subsystem 120 and the I/O subsystem 130 includes redundancy so that no equipment failures would cause complete disablement of the system 100.

Referring now to FIG. 2, a first exemplary embodiment of an optical cross-connect switching system 100 is shown. In general, the optical cross-connect switching system 100 is a matrix-based optical cross-connect with associated I/O port modules. More specifically, the optical cross-connect switching system 100 is collectively formed by a plurality of platforms 205, 206 and 207 in communication with each other, although the implementation of the switching system 100 as a single platform is another embodiment. Herein, each platform 205, 206 and 207 includes a frame 210 (e.g., a rack) that physically supports I/O port modules forming the I/O subsystem 130 as well as servo modules, servo control modules and/or network control modules of the switch control subsystem 120. The modules are arranged either horizontally or vertically within each platform 205, 206 and 207 and can be individually removed or installed without interfering with immediately adjacent modules.

In addition, the frame 210 may also physically support one or more optical switch cores, each including one or more optical switches (e.g., one type of "optical switch" may be two or more mirrors operating in tandem). Herein, a collection of one or more optical switches may also be generally referred to as "switch fabric." Thus, the terms switch fabric and optical switch core(s) are interchangeable.

As shown in this embodiment, the first platform 205 comprises (i) a plurality of I/O port modules 215 associated with the I/O subsystem 130 of FIG. 1, (ii) a plurality of servo, modules 225 and a management control subsystem (MCS) 235 associated with switch control subsystem 120 of FIG. 1, and (iii) a first (primary) optical switch core 240 associated with switch subsystem 110 of FIG. 1. Similarly, the second platform 206 comprises a plurality of additional I/O port modules 245, a plurality of (redundant) servo modules 250, a management control subsystem 255, and a second (redundant) optical switch core 260. The third platform 207 comprises a plurality of servo modules 265 that control various mirrors of the first and second optical switch cores 240 and 260, which correspond to additional ports associated with I/O port modules 245. Additionally, a light path test signal generator(s), a light path signal monitor(s), circuit breakers and/or alarm visual indication 270 may be located within the third platform 207. For clarity, the elements forming the first platform 205 are described since these elements may be found in the second and/or third platforms 206 and 207.

Figure 3:
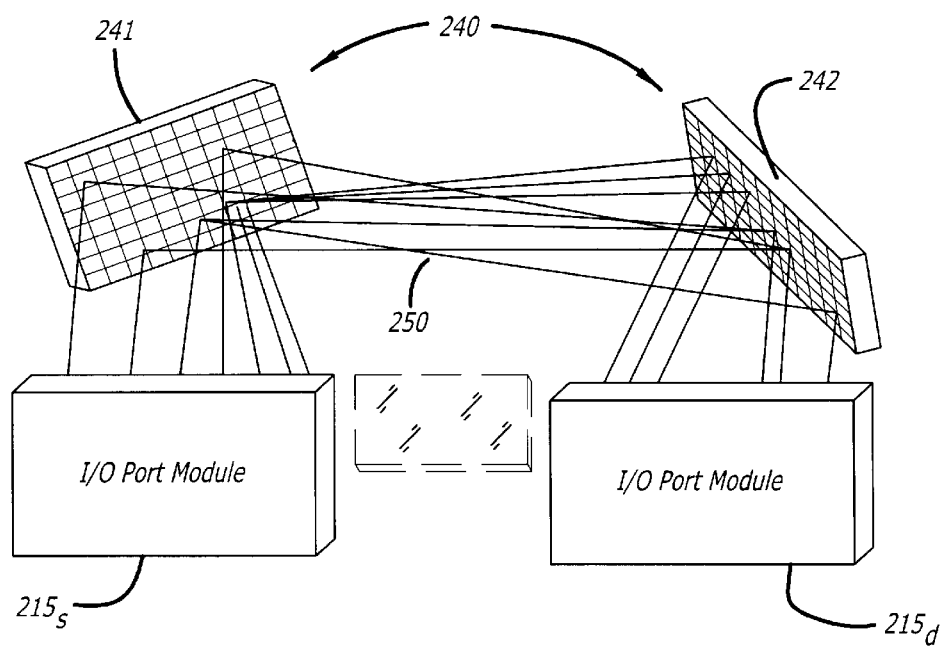
FIG. 3 is an exemplary embodiment of the optical fiber switch matrices forming an optical switch core of FIG. 2.
Figure 4:
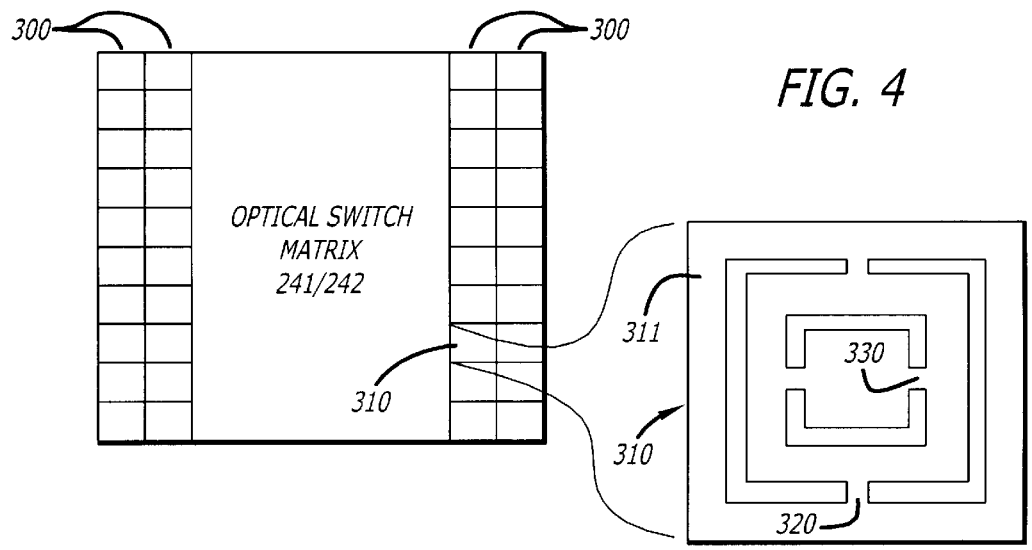
FIG. 4 is an exemplary embodiment of mirror arrays forming an optical switch matrix of FIG. 3.

As shown in FIGS. 2–4, the first optical switch core 240 includes a first optical switch matrix 241 and a second optical switch matrix 242. These matrices 241 and 242 are collectively positioned to route light signals 250 between a port of a source I/O port module 215s ("s" is a positive whole number) and a port of a destination I/O port module 21 5d ("d" is a positive whole number), both modules located in any of the platforms 205, 206 and 207 as shown in detail in FIG. 3, Although a two-bounce routing technique is shown, it is contemplated that a three-bounce routing technique may be used in which the "second bounce" mirror, as optionally shown through dashed lines, is positioned to assist in routing light signals from one optical switch matrix to another.

As shown in FIG. 4, one embodiment for each of the optical switch matrices 241 and 242 includes multiple arrays 300 of micro-machined mirrors. Each mirror (e.g., mirror 310) features a mirrored surface 311 and torsional flexures 320 and 330 that enable the mirror 310 to adjust its physical orientation to reflect incoming light signals in any selected direction. Herein, both the first and second optical switch matrices 241 and 242 include Q micro-machined mirrors, where "Q" is less than or equal to the maximum number of I/O ports that can be supported by the optical cross-connect switching system 100. For this embodiment, "Q" is greater than or equal to 64 but less than or equal to 1152 ($64 \leq Q \leq 1152$). However, the present invention is not limited to any maximum number of mirrors or I/O ports. It is contemplated, however, that the number of mirrors employed within the first and second optical switch matrices 241 and 242 may differ.

Figure 6:
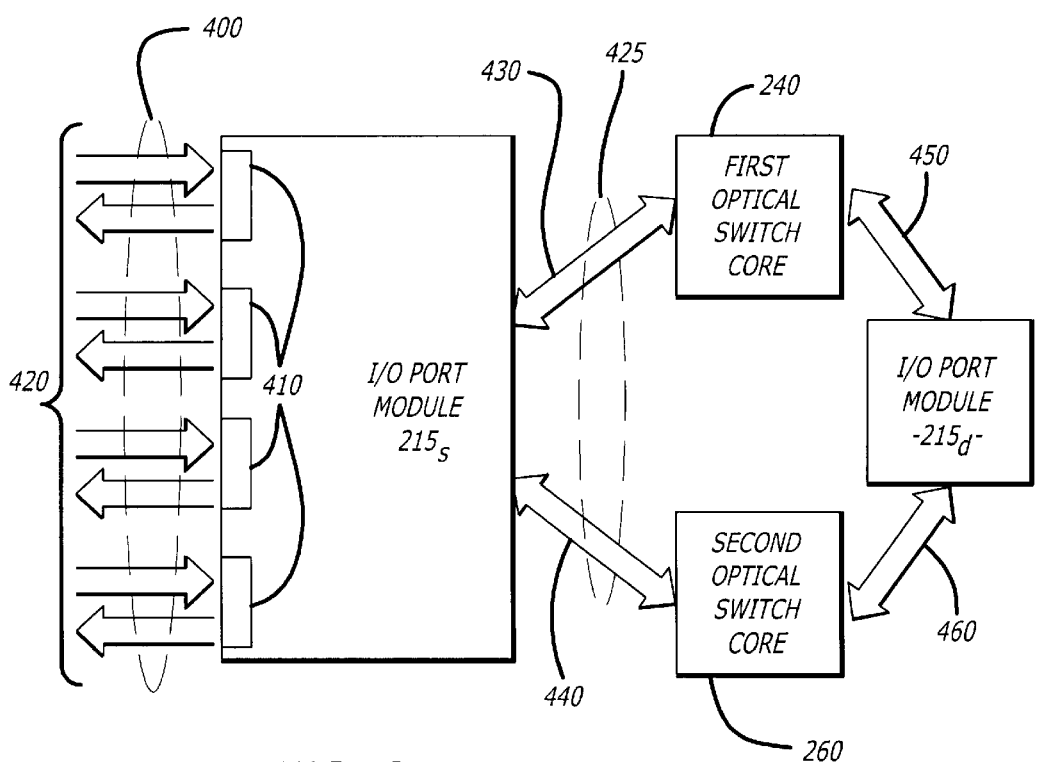
FIG. 6 is an exemplary embodiment of a data path for the transfer of light between I/O port modules and multiple fiber optical switch cores of FIG. 2.
Figure 5:
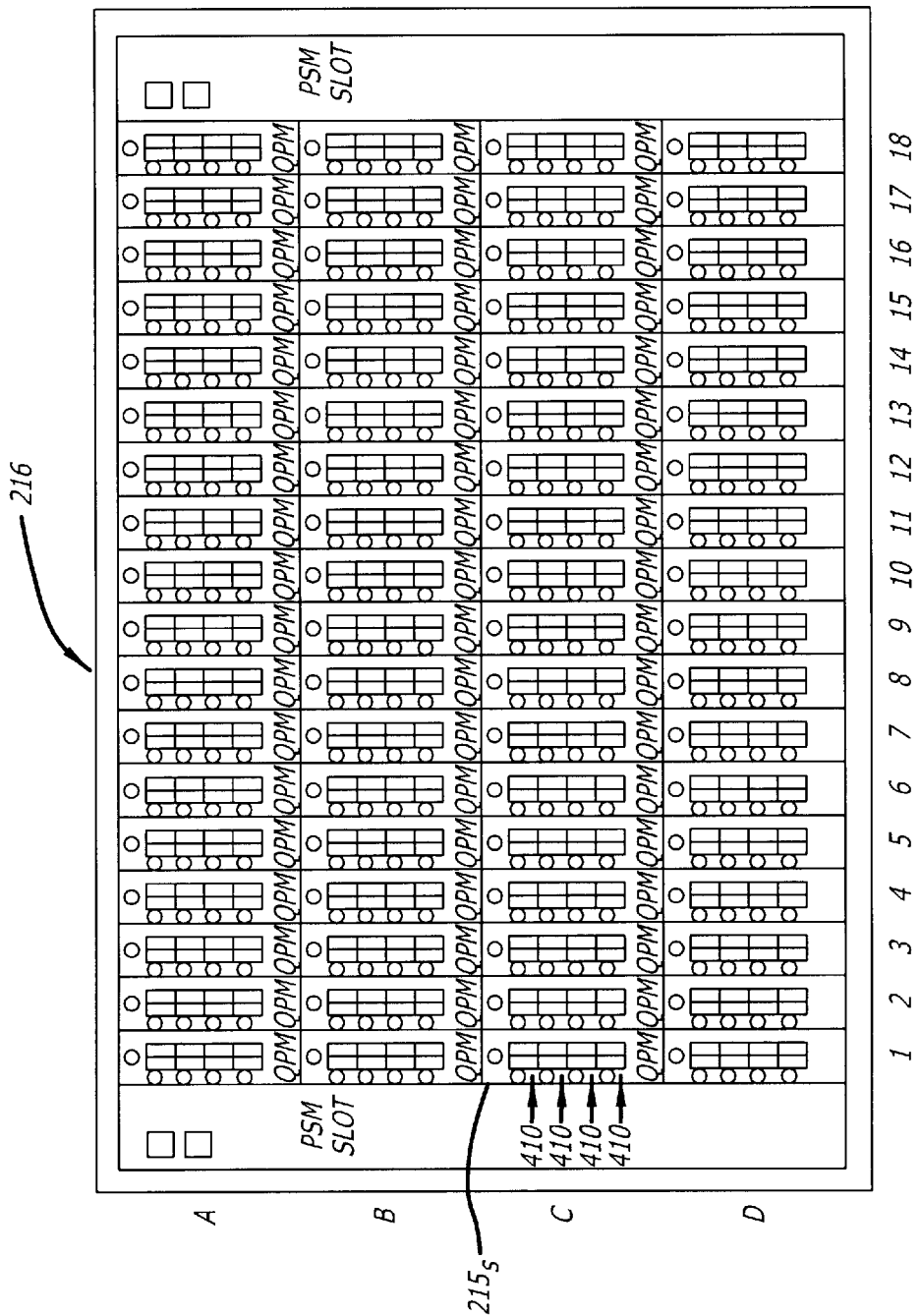
FIG. 5 is an exemplary embodiment of an I/O subsystem featuring a plurality of I/O port modules.

As generally shown in FIGS. 2, 5 and 6, the plurality of I/O port modules 215 features two groups 216 and 217 of I/O port modules. Each group, such as group 216 or 217 for instance, includes up to seventy-two (72) quad-port I/O port modules as shown in FIG. 5 that receive power from one or more power supply modules denoted herein as "PSM". The components forming an I/O port module is described below and shown in FIGS. 8 and 9. Thus, each I/O port module, such as I/O port module $215_s$ for example, features an external interface 400 for a plurality of I/O ports 410 (e.g., four I/O ports). An I/O port 410 features a duplex socket that is adapted to receive a duplex pair of optical fiber links, one optical fiber link routes a light signal to the I/O port 410 while the other routes light signals from the I/O port 410. This supports bi-directional optical connections. There is a small percentage (e.g., less than 15%) of these I/O ports, however, that may be assigned as test access ports as described below.

Moreover, as shown in FIG. 6, upon receiving an incoming light signal over an optical fiber link 420, the 110 port module $215_s$ performs a bridging operation by splitting the incoming light signal into multiple (two or more) bridged light signals for routing to the first and second optical switch cores 240 and 260. The bridged light signals are routed through an internal optical interface 425 featuring optical fiber ribbon links 430 and 440. For this embodiment, the "optical fiber ribbon links" are ribbon cables having multiple optical fiber lines (e.g., two lines from each I/O port). The first optical switch core 240 provides a primary optical path. The second optical switch core 260 provides a redundant optical path in the event the first optical switch core 240 is not operating properly. The optical switch cores 240 and 260 route the bridged light signals to a selected port of a destination I/O port module (e.g., I/O port module $215_d$) via optical fiber ribbon links 450 and 460.

Figure 7:
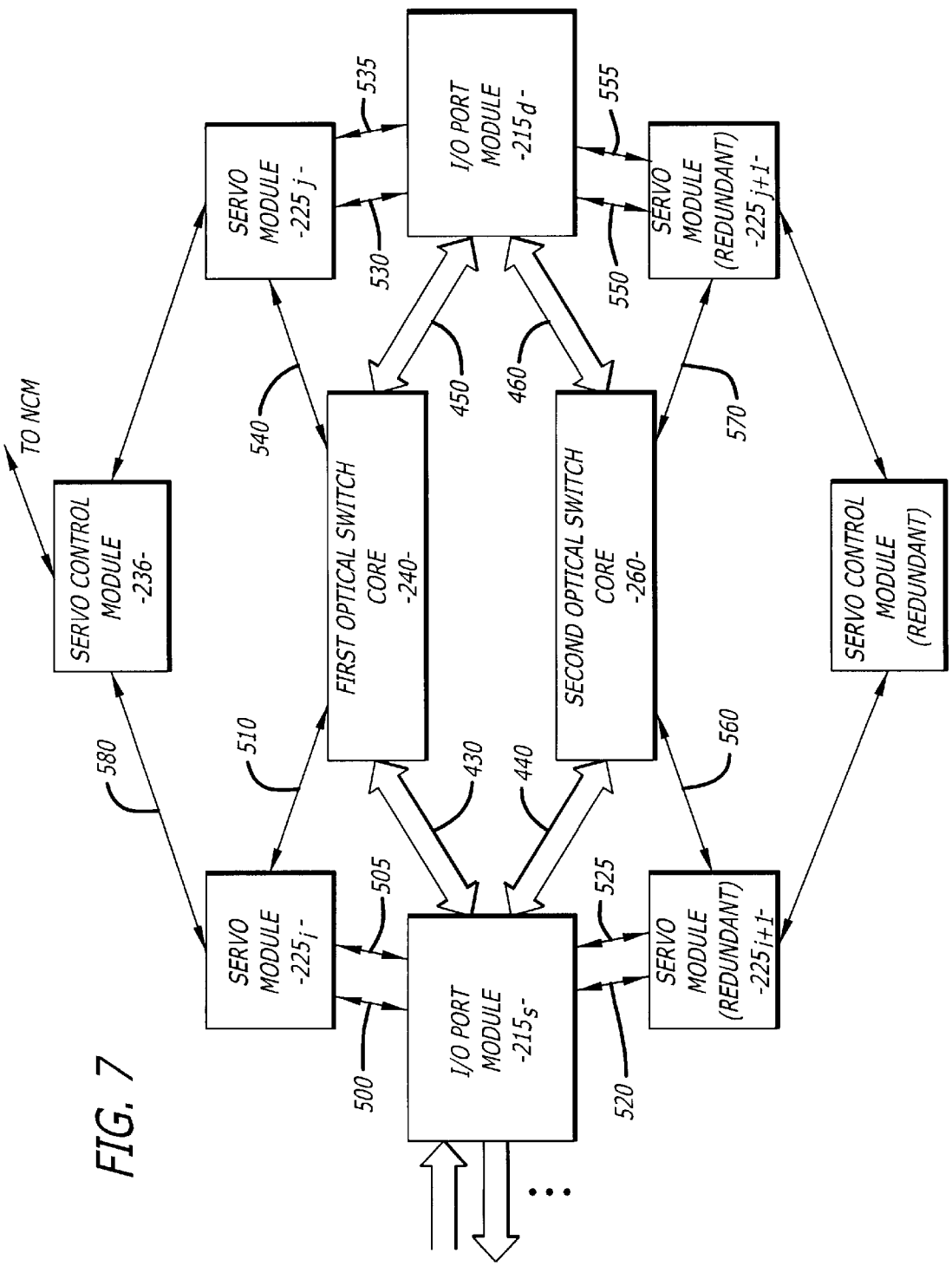
FIG. 7 is an exemplary embodiment of a control path featuring the interconnections between the I/O port module and servo modules.

Upon receiving light signals from both the first and second optical switch cores 240 and 260, the I/O port module 215s provides small percentage optical tap signals of the received light paths to the respective servo modules, which in turn determine light signal quality. The respective servo modules will convey light signal quality for each respective light path to the I/O port module, using a digital protocol over an electrical communication link 505 to the I/O port module as shown in FIG. 7. The I/O port module $215_s$ will in turn, determine (i.e. select) which light signal has the higher signal quality and outputs that signal via interface 400. In most cases, the signal quality of the two light paths presented to the I/O port module will be of the same signal quality and each may have a relatively low optical loss of approximately seven decibel (7 decibels "dB") or less. For instance, a 3 dB loss caused by a splitter, approximately 3 dB loss caused by an optical switch core and approximately a 1 dB loss at an optical switch as described below.

Referring now to FIGS. 2 and 7, each servo module 225 is configured to receive optical tap signals from one or more I/O port modules. Herein, servo module $225_i$ is configured to receive optical tap signals via link 500 from I/O port module $215_s$. These optical tap signals provide feedback to indicate a percentage of the bridged light signals and also allow for light to be injected under certain conditions. In response to receiving optical tap signals via link 500, the servo module $225_i$ provides mirror control signals over link 510 to the first optical switch core 240. The mirror control signals are routed via a unique communication path to an optical switch (e.g., a micro-machined mirror) and are associated with the port of the I/O port module $215_s$ through which the incoming light signal was routed. The mirror control signals are used for proper adjustment of the physical orientation of the mirror.

The I/O port module $215_d$ provides optical tap signals over link 530 to servo module $225_j$. In response to receiving the optical tap signals from I/O port module $215_d$, the servo module $225_j$ provides mirror control signals via link 540 to the first optical switch core 240. The mirror control signals are routed via a unique communication path to a micromachined mirror associated with a selected port of the I/O port module $215_d$ from which the light signal would be output. Herein, sensing the optical tap (feedback) signals, the servo module $225_j$ determines the light signal quality and conveys light signal quality information for each light path using a digital protocol over (electrical) link 535. Thereafter, the I/O port module $215_d$ chooses the selected port (i.e. port having the best light signal quality).

Collectively, the optical tap signals, mirror control signals and light signal quality information, which are routed over links 500, 510, 530, 540, 505 and 535, are used by servo modules $225_i$ and $225_j$ for adjustment of the physical orientation of mirrors to make a connection between I/O port module $215_s$ and $215_d$.

Additionally, I/O port modules $215_s$ and $215_d$ also transfer optical tap signals via links 520 and 550, respectively. Similar to the above description, these optical tap signals establish the redundant optical path by altering the physical orientation of one or more micro-machined mirrors of the second optical switch core 260 using mirror control signals over links 560 and 570 and light signal quality information via links 525 and 555.

Figure 11:
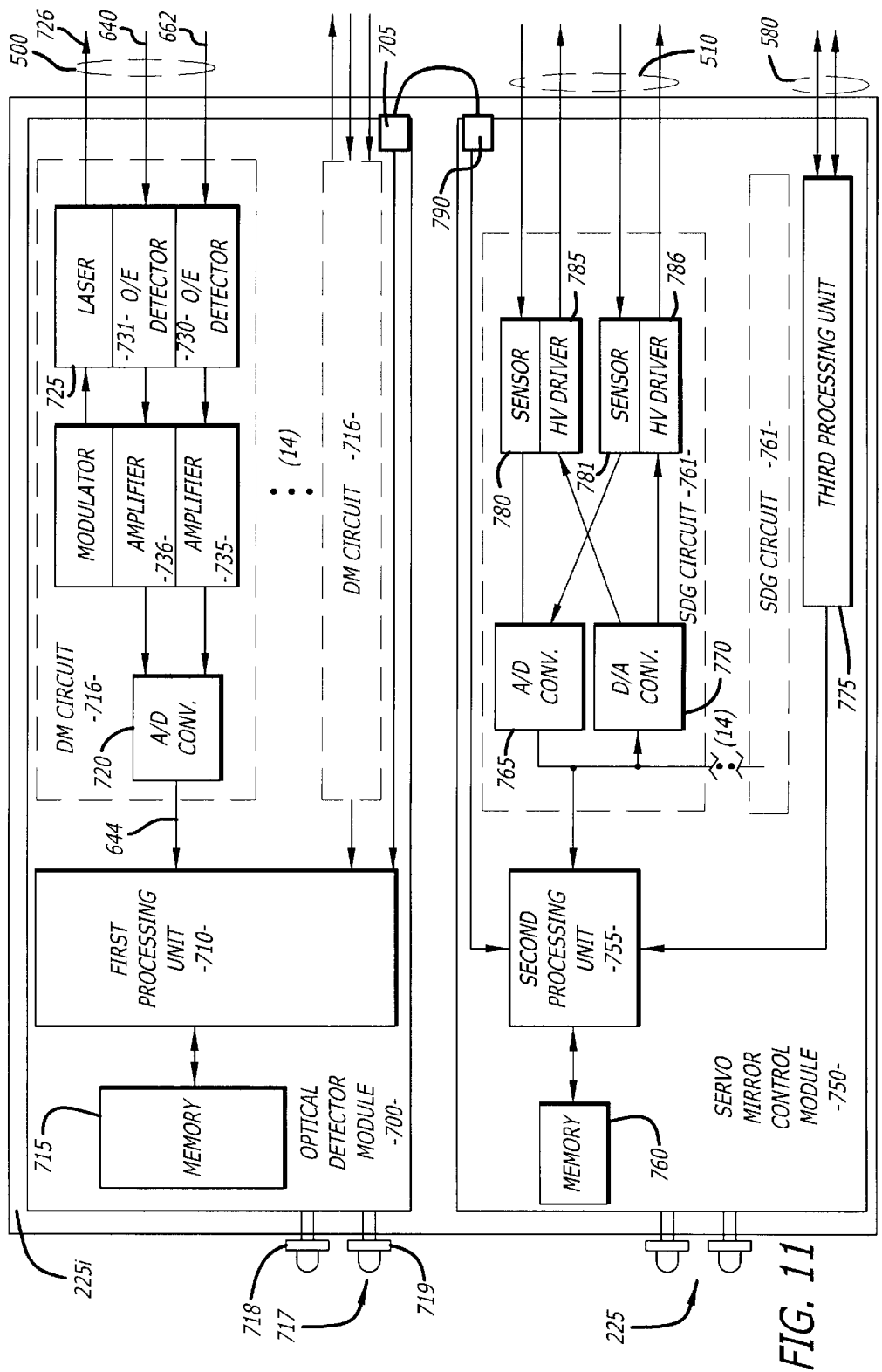
FIG. 11 is an exemplary embodiment of a servo module of the optical cross-connect system of FIG. 1.

In the event that no optical power is presented to the I/O port module $215_s$, a substitute light signal may be injected from the servo module $225_i$ via link 500. An alignment laser may be used as shown in FIG. 11 described below. This process of light substitution allows for connection establishment and verification when no input light is present to the I/O port module $215_s$. The substitute light source can be within the same wavelength range (e.g. 1100 nanometers "nm"–1700 nm) as the allowed input light signal range. In one embodiment, the light source or method of injection would be chosen to not interfere with attached equipment's select operational wavelength range. Choosing a different wavelength source on the servo module and/or a wavelength specific splitter and/or filter on the I/O port module could do this particular embodiment.

The management control subsystem 235 (see FIG. 2) enables communications between two or more servo modules placed within the same or different platforms. The management control subsystem 235 includes at least one servo control module 236 and an optional network control module 238. In one embodiment, the servo control module (SCM) 236 ensures communication between at least servo modules $225_i$ and $225_j$ that control mirrors associated with the first optical switch core 240. The network control module (NCM) 238 manages the execution of connection configurations for the whole cross-connect switching system and ensures communications between multiple servo control modules 236 and 237. The same architecture is used to control optical switches within the second optical switch core 260 as shown.

II. General Architecture of the I/O Port Modules

Figure 8:
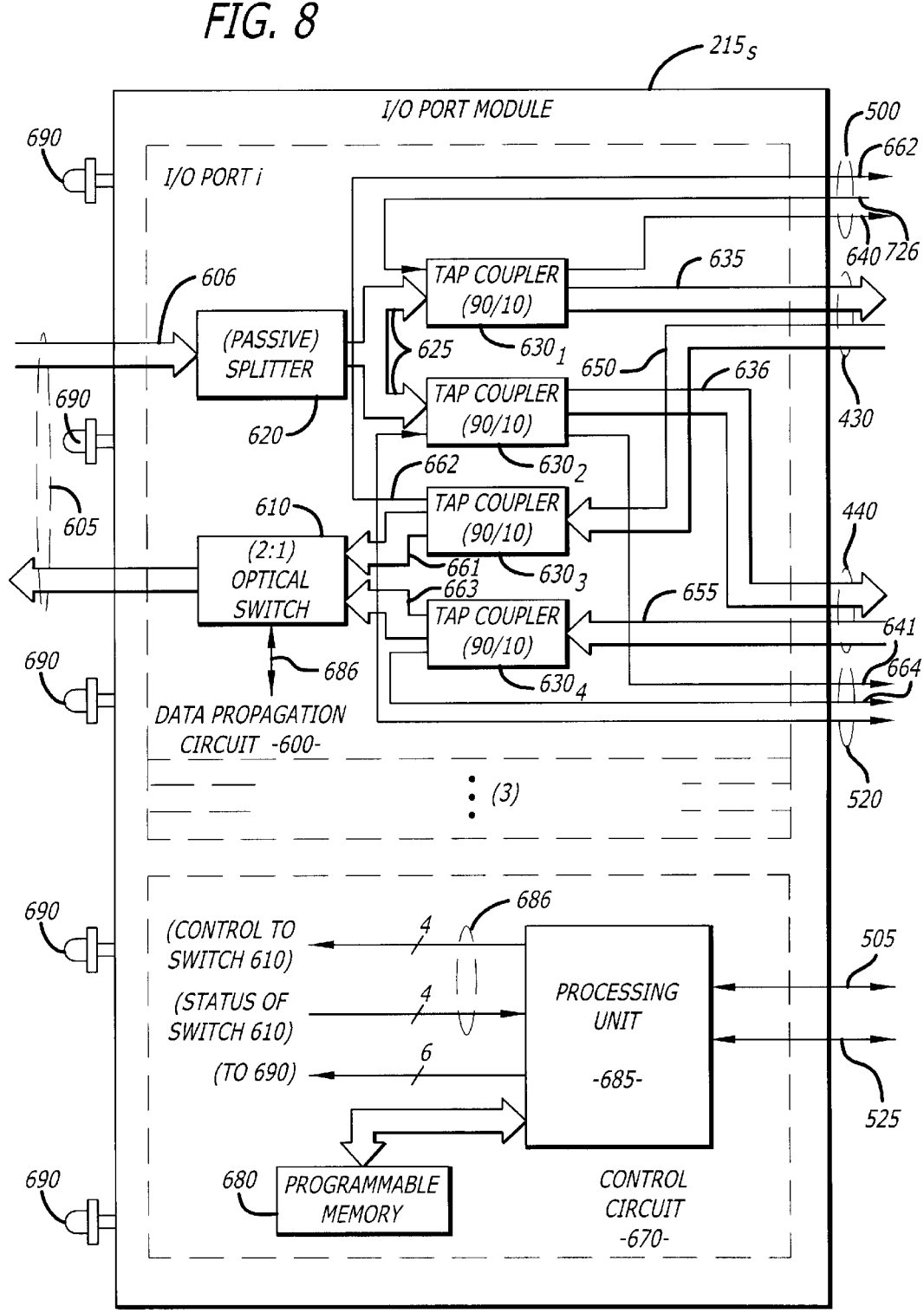
FIG. 8 is an exemplary embodiment of the I/O port module of FIGS. 6 and 7 illustrating a data propagation circuit and a control circuit.
Figure 9:
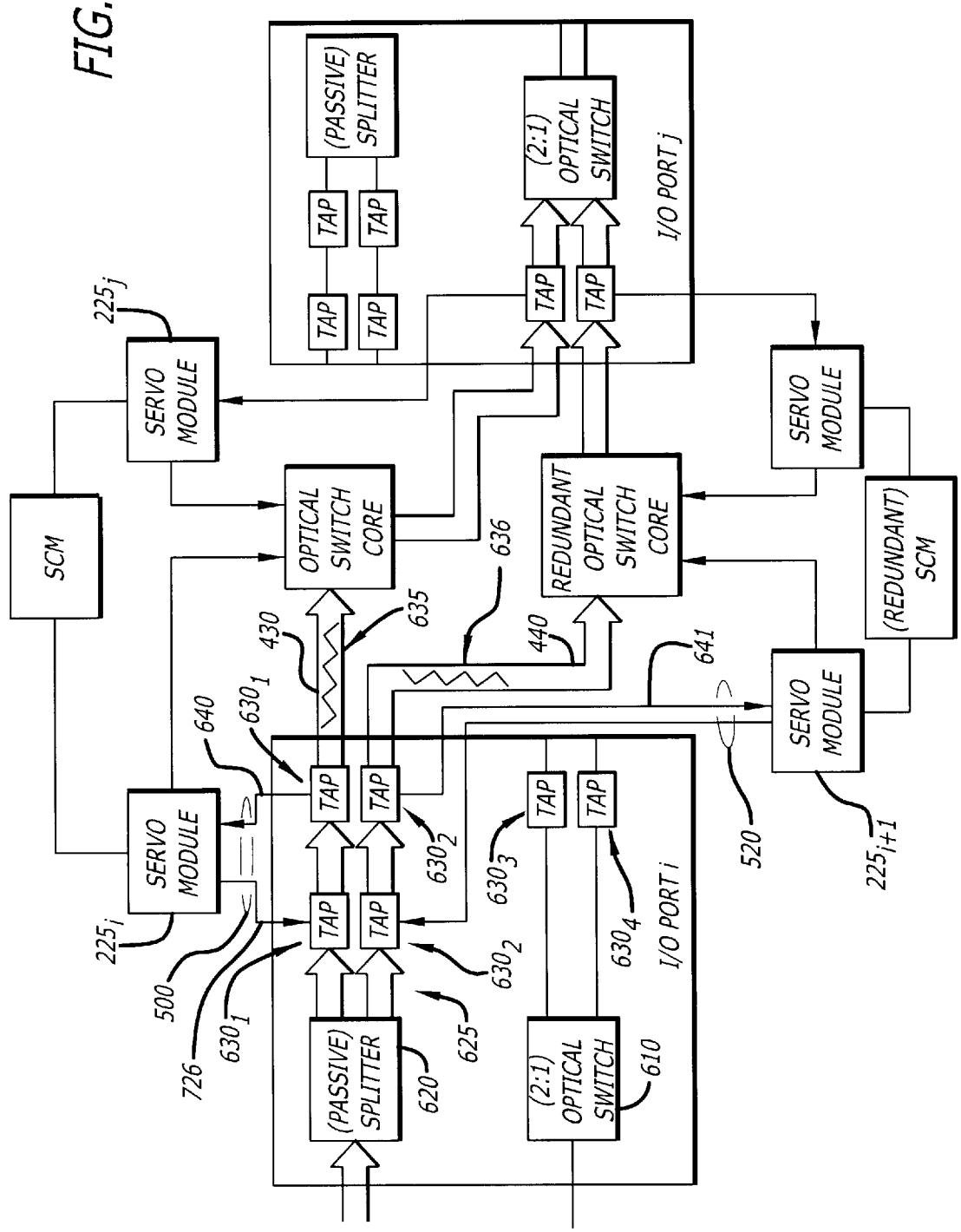
FIG. 9 is an exemplary embodiment of multiple ports of I/O modules in communication with optical switches controlled by servo modules.

Referring now to FIGS. 8 and 9, an exemplary embodiment of an I/O port module (e.g., I/O port module $215_s$) and its communications over optical switch cores 240 and 260 is shown. I/O port module $215_s$ includes a data propagation circuit 600 for each I/O port and a control circuit 670. Thus, in the event that the I/O port module $215_s$ is configured with four I/O ports, four data propagation circuits are implemented on the I/O port module $215_s$ as represented. Only the data propagation circuit 600 for one of the I/O ports of I/O port module $215_s$ (e.g., $i^{th}$ I/O port) is shown in detail for clarity sake.

In one embodiment, the data propagation circuit 600 comprises an optical switch 610, a (passive) splitter 620 and a plurality of tap couplers $630_1$–$630_4$. The plurality of tap couplers $630_1$–$630_4$ correspond to the pairs of optical fibers found in optical fiber ribbon links 430 and 440. The control circuit 670 comprises a programmable memory 680, a processing unit 685 and status identification components 690.

As shown, each port of the I/O port module 215, supports full-duplex communications. Thus, an incoming light signal 606 received over port 605 is routed to the splitter 620. The splitter 620 effectively performs a bridging operation by splitting the incoming light signal 606 into bridged light signals 625, which collectively have the same power level (energy) as the light signal 606. In one embodiment, when the splitter 620 is a 50/50 splitter, the bridged light signals 625 have equal power levels. However, it is contemplated that splitter 620 may produce bridged light signals 625 having disproportionate power levels.

The bridged light signals 625 are routed through the tap couplers $630_1$ and $630_2$. Attached to servo module $225_i$ and servo module $225_{i+1}$ via optical tap links 500 and 520, the tap couplers $630_1$ and $630_2$ are used to monitor the power level of light signals 635 and 636 propagating through optical fiber ribbon links 430 and 440 (referred to as "outgoing light signals"). This enables the servo modules $225_i$ and $225_{i+1}$ to verify the connectivity of the splitter 620 to optical fiber ribbon links 430 and 440 and to detect unacceptable variances in optical performance of the light signal. As shown for this embodiment, the tap couplers $630_1$ and $630_2$ may separate the bridged light signals into signals having disproportionate power levels in order to maximize the power levels of the outgoing light signals propagating through optical fiber ribbon links 430 and 440. For example, where the tap couplers $630_1$ and $630_2$ may operate as 90/10 splitters, the outgoing light signals 635 and 636 have ninety (90%) of the total power level of the bridged light signal while the optical tap signals 640 and 641 have only ten percent (10%).

Referring to FIG. 8, tap couplers $630_3$ and $630_4$ are configured to receive incoming light signal 650 and 655 via optical fiber ribbon links 430 and 440, respectively. The tap couplers $630_3$ and $630_4$ effectively separate the light signals 650 and 655 into corresponding pairs of light signals having disproportionate power levels (e.g., signals 661, 662 and 663, 664). Signals 662 and 664 having the lower power level are provided to the servo module $225_i$ and servo module $225_{i+1}$ via links 500 and 520 for monitoring the power levels of the light signals 30 661 and 663, without the light signals 661 and 663 experiencing substantial signal degradation. The signals 662 and 664 may be light signals that undergo O/E conversion at the I/O port module $^215$, or at the servo modules $225_i$ and $225_{i+1}$ as shown in FIG. 11. The tap couplers $630_3$ and $630_4$ are shown as 90/10 splitters; however, tap couplers $630_3$ and $630_4$ may be any selected ratio, including 50/50.

The light signals 661 and 663 are routed to the optical switch 610 of a destined I/O port. The control circuit 650 on the I/O port module $215_s$ determines which of the pair of light signals 661 and 663 has the best signal quality based on conveyed light signal quality information from the servo modules via links 505 and 525 as briefly described below. Parameters used to determine light signal quality include measured optical signal intensity/power, extinction ratio, and the like. The light signal quality information to the I/O port module may be conveyed as failed due to the servo module service operations, high bit error rate, an external light path has failed, and the like. The light signal 661 or 663 with the best signal quality is output through the I/O port 605. Of course, it is contemplated that the light signal output operations described for I/O port i are applicable to I/O port j as shown.

Figure 10:
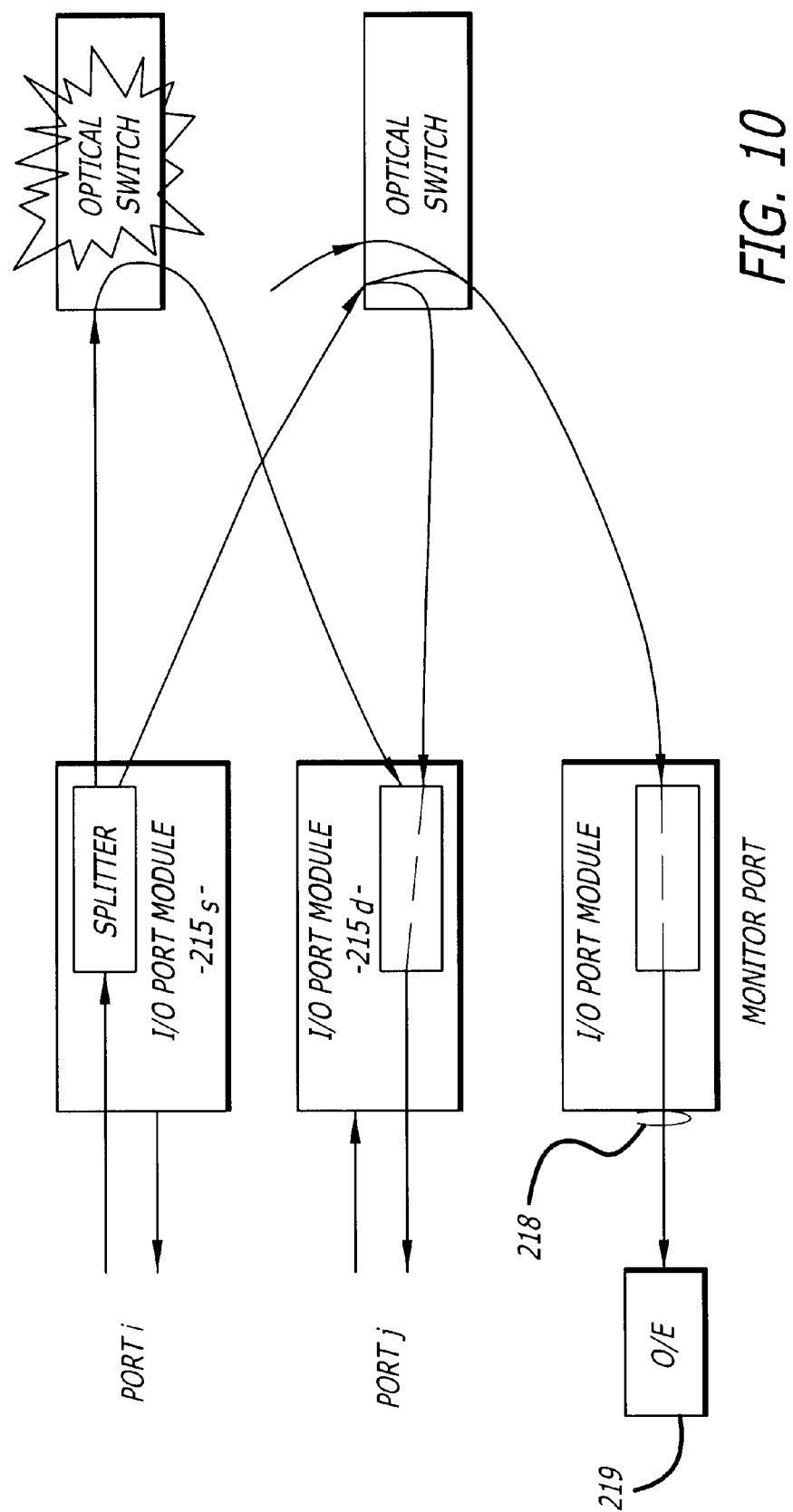
FIG. 10 is an exemplary embodiment of an I/O port configured as a test access port.

It is contemplated that an I/O port of the I/O port module $215_s$ may be configured as a test access port. A "test access port" is an I/O port that is used for monitoring light signals routed through another port. Normally, the test access port receives a portion of the power level of a light signal routed through a selected optical switch (e.g., micro-machined mirror). For example, as shown in FIG. 10, an I/O port 218 of the I/O port module $215_s$ is configured for coupling with a monitoring device 219 (e.g., a bit error rate "BER" monitor in combination with an optical-electrical "O/E" converter, etc.) to monitor a power level of a light signal routed to the $i^{th}$ I/O port from an optical switch.

Referring back to FIG. 8, the control circuit 670 comprises the programmable memory 680 in communication with the processing unit 685 (e.g., FPGA). The programmable memory 680 contains software and other information used by the processing unit 685 to provide selection of the best quality signal based on digital electrical signaling from servo module $225_i$ and servo module $225_{i+1}$ over links 505 and 525, respectively. Also, programmable memory 680 includes information used by the processing unit 685 to control the state of the status identification components 690 (e.g., light emitting diodes "LEDs"). The state of the status identification components 690 identifies (1) whether each I/O port is operational and/or (2) whether the I/O port module is operational. The processing unit 685 is further in communications with optical switches of each data propagation circuit employed in the I/O port module $215_s$ in order to receive switch status signals and provide switch control signals. As shown for clarity, processing unit 685 provides optical switch 610 with switch control signals for receiving switch status signals and selecting either light signal 661 or light signal 663.

III. General Architecture of the Servo Modules

Referring now to FIG. 11, an exemplary embodiment of the servo module (e.g., servo module $225_i$) is shown. In one embodiment, the servo module $225_i$ comprises two separate modules in communication over connectors 705 and 790.

These separate modules are referred to as an "optical detector module" 700 and a "servo mirror control module" 750.

The optical detector module 700 comprises a first processing unit 710, memory 715, a plurality of detection/modulation (DM) circuits 716 and status 20 identification components 717. As shown, the optical detector module 700 features sixteen (16) DM circuits 716 to support four (4) quad-port I/O port modules. Each DM circuit 716 includes an analog-to-digital (A/D) converter 720, a laser 725, optical-electrical (O/E) detectors 730 and 731, and optional amplifiers 735 and 736.

The servo mirror control module 750 comprises a second processing unit 755, a memory 760, a plurality of mirror signal detection and generation (SDG) circuits 761, a third processing unit 775 and status identification components 795. The SDG circuits 761 correspond in number to the DM circuits 716 of the optical detector module 700. Each SDG circuit 761 features an A/D converter 765, a digital-to-analog (D/A) converter 770, hinge position sensors 780–781 and high voltage (HV) mirror drivers 785–786.

As shown in FIG. 11, the optical detector module 700 is removably coupled to the servo mirror control module 750. This allows the optical detector module 700 to be "hot swapped" from a backplane, which features connectors 705 and 790 connecting the optical detector module 700 to the servo mirror control module 750, without disrupting the servo mirror control module's 750 ability to hold the mirrors in their existing positions for an extended period of time. This "hot swapping" of the optical detector module 700 allows for repair or upgrade of the optical detector module 700. Optical detector module 700 receives optical tap (feedback) signals 640 and 662 from one or more I/O port modules (e.g., I/O port module $215_s$ via link 500) and can transmit optical control signals 726 from the laser 725 for alignment of light signals transferred between two I/O port modules. The optical tap signal 640 is based on an input light signal that is routed to the switch fabric.

More specifically, with respect to servo module $225_i$, the O/E detectors 730 and 731 are coupled to tap couplers $630_1$ and $630_3$ of FIGS. 8–9. More specifically, the O/E detectors 730 and 731 are configured to detect incoming, optical tap signals 640 and 662, convert the optical tap signals 640 and 662 into corresponding electrical control signals measuring a power level of the outgoing light signal, and optionally route the electrical control signals to corresponding amplifiers 735 and 736. The (amplified) electrical control signals are provided to the A/D converter 720. The A/D converter 720 converts the electrical control signals into measured power sense signals 644 of a digital form. The measured power sense signals 644 are provided to the first processing unit 710.

Herein, the first processing unit 710 may perform a number of operations based on the electrical control signals such as threshold crossing, LOS integration, input/output power ratio analysis and the like. Software and other information necessary for performing these operations may be obtained from the memory 715 by the first processing unit 710. Herein, memory 715 can be non-volatile memory such as non-volatile random access memory, electrically erasable programmable read only memory (EEPROM) and the like.

The optical detector module 700 includes multiple status identification components 717 (e.g., light emitting diodes "LEDs"). A first LED 718 identifies whether any operational faults associated with the servo module $225_i$ have occurred. A second LED 719 indicates when the optical detector module 700 is in service.

Referring still to FIG. 11, in this embodiment, the servo mirror control module 750 comprises the second processing unit 755 that is coupled to both the first processing unit 710 and the third processing unit 775. For instance, in order to adjust the switch fabric in response to the measured power sense signals 644, the second processing unit 755 receives information representative of the measured power sense signals from the first processing unit 710 via connectors 705 and 790. The second processing unit 755 further receives information representative of measured power sense signals for the light signal at a targeted I/O port. This information is provided by the SCM 236 over link 580 via the third processing unit 775. This assists in reducing errors in adjusting the torsional flexures of the mirrors.

Upon receipt of these measured power readings, the second processing unit 755 controls a particular SDG circuit corresponding to a mirror associated with the I/O port over which the tapped light signal was routed. The control involves slight mirror orientation adjustments if the power level readings differ substantially.

In particular, a first hinge position sensor 780 senses a position of a mirror via link 510 from the first optical switch core 240. The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 785 and applied to a selected mirror of the first optical switch core in order to adjust the amount of torsional flexure along a first dimensional plane (e.g., X-axis). This is accomplished to minimize the loss experienced by the light signal.

A second hinge position sensor 781 senses a position of a mirror for the first optical switch core along a second dimensional plane (e.g., Y-axis). The sensed position signal is routed to the A/D converter 765, which is subsequently placed in a digital format before routing to the second processing unit 755. When the servo module $225_i$ is adjusting the switch fabric, the second processing unit 755 transfers mirror control signals to the D/A converter 770. The mirror control signals are routed to HV driver 786 and are applied to the selected mirror of the first optical switch core in order to adjust the amount of torsional flexure along the second dimensional plane. The specifics of the hinge position sensors 780 and 781 are described in a PCT application entitled "Micromachined Members Coupled for Relative Rotation By Torsional Flexure Hinges" (International Publication No. WO 00/13210) published on or around Mar. 9, 2000.

In another embodiment, when I/O port module $215_s$ is the destination of a light signal, the second processing unit 755 receives information representative of the measured power sense signals associated with the optical tap signal 662 that has been analyzed by the first processing unit 710. The optical tap signal 662 is based on an output light signal being routed from an I/O port. In this situation, the third processing unit 775 receives information associated with the measured power sense signals from a source I/O port as reported by SCM 236 over link 580.

IV. Redundant Architecture of the Optical Cross-Connect Switching System

Figure 12:
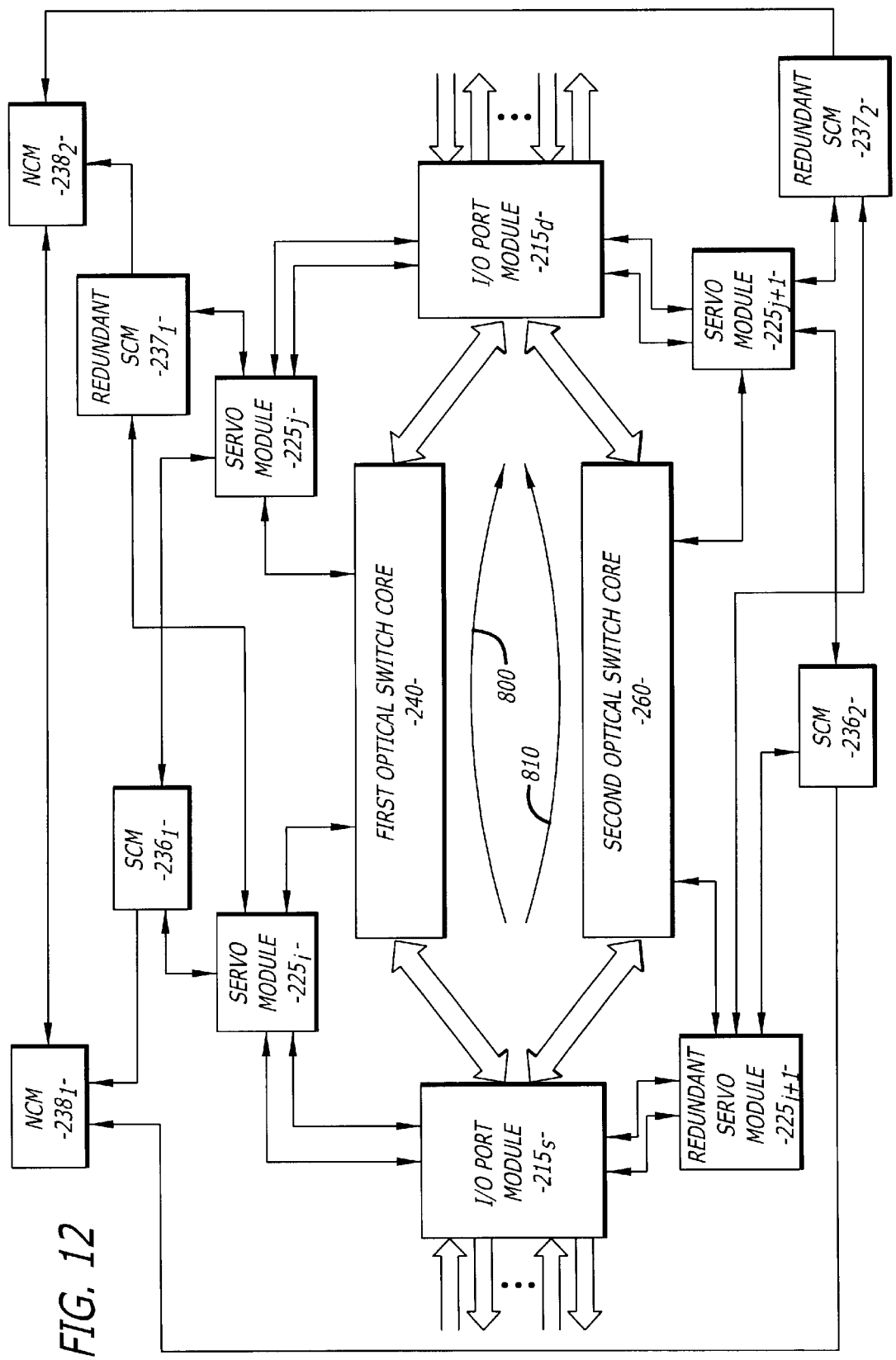
FIG. 12 is an exemplary block diagram of a redundant architecture of the optical cross-connect switching system of FIG. 1.

Referring now to FIG. 12, a block diagram of an alternative embodiment of the architecture of the optical cross-connect switching system of FIG. 1 is shown which includes redundant protection capabilities. Redundancy is desired in order to increase the reliability of such an optical cross-connect switching system. Aside from the I/O port modules, all other modules are duplicated to obtain the desired redundancy. Thus, it is necessary for light signals from a source I/O port module $215_s$ to be routed to a destination I/O port module $215_d$ through two optical paths, namely a primary optical path 800 using a first optical switch core 240 and a redundant optical path 810 using a second optical switch core 260.

With respect to the primary optical path 800, a servo module $225_i$ is connected to both the source I/O port module $215_s$ and the first optical switch matrix (not shown) of the first optical switch core 240. In particular, the servo module $225_i$ controls the physical orientation of a mirror of the first optical switch matrix that corresponds to the source I/O port module $215_s$. To establish and maintain the primary optical path 800 for the light signal, the servo module $225_i$ needs to communicate with other servo modules such as servo module $225_j$. Thus, a servo control module (SCM) is implemented to support such communications, possibly through a time-slot switching arrangement.

As shown, the SCMs $236_1$–$236_2$ are also duplicated so that each servo module 225 is connected to at least two SCMs $236_1$–$236_2$. Thus, in the event that the SCM $236_1$ fails, the primary optical path 800 remains intact because communications between the servo modules $225_i$ and $225_j$ are maintained via redundant SCM $237_1$. The transfer is accomplished by temporarily halting the adjustment of (i.e. freezing) the mirrors inside the first optical switch core 240 while control is transferred from SCM $236_1$ to SCM $237_1$. The SCMs $236_1$ and 237, associated with the first optical switch core 240 are in communication via a network control modules (NCMs) $238_1$ and $238_2$ for example.

With respect to the redundant optical path 810, a servo module $225_{i+1}$ is connected to both the source I/O port module $215_s$ and one or more mirror(s) of a first optical switch matrix (not shown) of the second optical switch core 260. Another servo module $225_{j+1}$ is connected to both the destination I/O port module $215_d$ and one or more mirror(s) of a second optical switch matrix (not shown) of the second optical switch core 260. The orientation of these mirrors produces the redundant optical path 810.

To establish and maintain the redundant optical path 810 for the light signal, a SCM $236_2$ may be implemented with a dedicated time-slot switching arrangement in order to support continuous communications between the servo module and another redundant servo module associated with the destination I/O port module. As shown, the SCM $236_2$ is also duplicated so that each servo module $225_{i+1}$ and $225_{j+1}$ is connected to at least two SCMs $236_2$ and $237_2$. Thus, the redundant optical path 810 is maintained even when one of the SCMs $236_2$ and $237_2$ fails. The SCMs $236_2$ and $237_2$ associated with the second optical switch core 260 communicate via the first NCM $238_1$ and the second NCM $238_2$, respectively. The second NCM $238_2$ is in communication with the first NCM $238_1$ to allow all SCMs and servo modules to communicate for coordination of the primary optical path 800 and the redundant optical path 810.

V. Detailed Overview of the Bridging Technique for the Optical Cross-Connect Switching System Referring now to FIGS. 13–16, exemplary embodiments of the bridging technique for redirecting signals to prevent against disruption of an optical path of the optical cross-connect switching system due to facility or equipment failures is shown.

Figure 13:
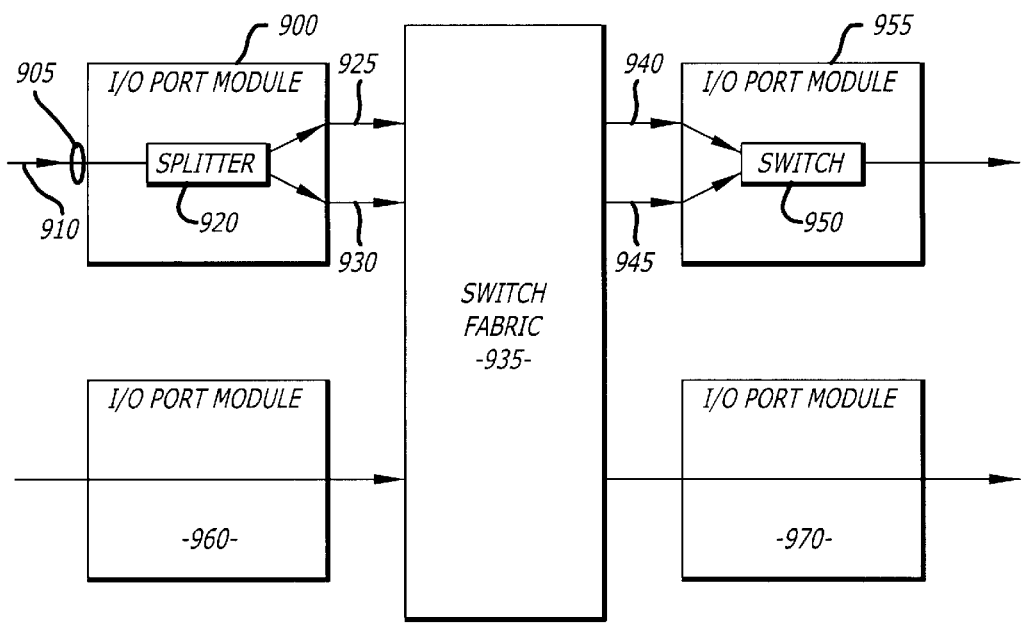
FIG. 13 is a first exemplary embodiment of a bridging technique associated with an optical cross-connect switching system.

A first exemplary embodiment of a bridging technique utilized by a source I/O port module 900 is shown in FIG. 13. In particular, a port 905 of the source I/O port module 900 receives a light signal 910 and subsequently routes the light signal 910 to one or more splitters 920. For clarity sake, one or more splitters are referred to in a singular tense as "splitter".

Herein, the splitter 920 effectively produces two outgoing light signals with generally equivalent power (energy) levels, which are routed over links 925 and 930. In one embodiment, the collective power level measured for the outgoing light signals is generally equal to the power level of the light signal 910 minus the additional energy loss caused by the splitter 920 (e.g., approximately 3 dB).

The two outgoing light signals are subsequently routed over links 925 and 930 over to different inputs of a switch fabric 935. In one embodiment, the switch fabric 935 may be an optical switch core formed with two optical switch matrices of micro-machined mirrors as described above. However, it is contemplated that the particular configuration of the switch fabric 935 is not relevant to the inventive bridging technique described below.

The switch fabric 935 routes the outgoing light signals over links 940 and 945 to a switch 950 within a destination I/O port module 955. The optical switch 950 is configured to select one of the light signals received over links 940 and 945 based on any number of signal quality parameters such as measured optical signal intensity/power, extinction ratio, and the like. Of course, it is contemplated that certain I/O port modules (e.g., modules 960 and 970) may be implemented within the optical cross-connect switching system but devoid of any bridging functionality.

Figure 14:
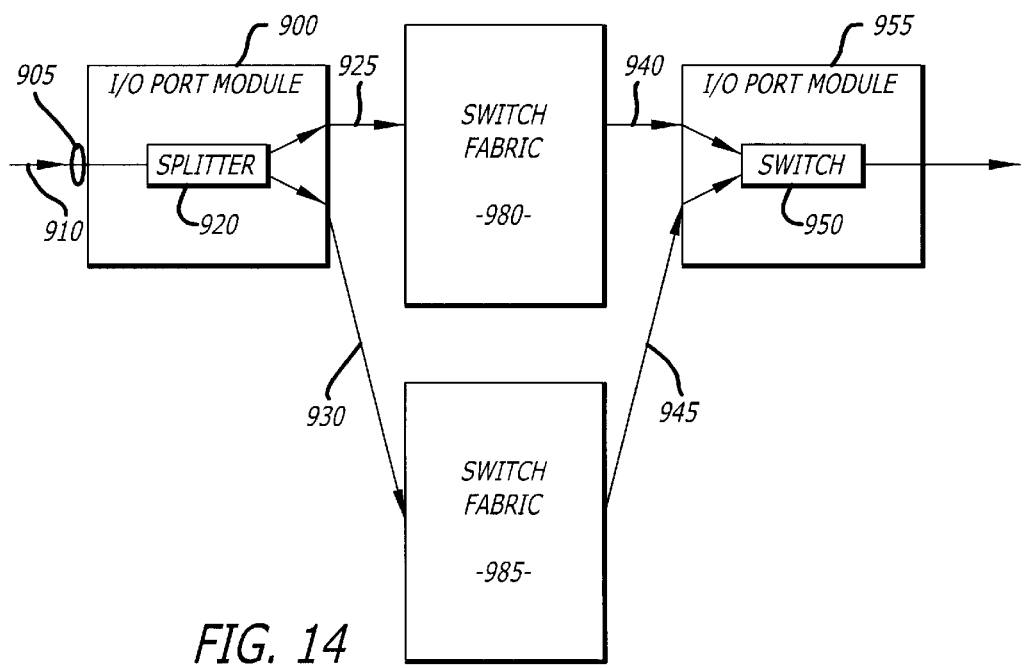
FIG. 14 is a second exemplary embodiment of a bridging technique associated with an optical cross-connect switching system.

As shown in FIG. 14, a second exemplary embodiment of a bridging technique utilized by the source I/O port module 900 to separate the original light signal 910 into multiple outgoing light signals which are routed to multiple optical switches is shown. In particular, the port 905 of the source I/O port module 900 receives the light signal 910 and subsequently routes the light signal 910 to the splitter 920. For this embodiment, the splitter 920 effectively produces at least two outgoing light signals with generally equivalent power (energy) levels routed over links 925 and 930. Link 925 provides a first outgoing light signal to the switch fabric 980 while link 930 provides a second outgoing light signal to another switch fabric 985. Herein, in this embodiment, each switch fabric 980 or 985 includes a switching technology, possibly optical switch matrices as described above. The switch fabric 980 and 985 may be one or more optical switches in the same optical switch core or different optical switch cores.

In response to receiving the first outgoing light signal, the switch fabric 980 routes the same over link 940 to the optical switch 950. The switch fabric 985 routes the second outgoing light signal over link 945 to the optical switch 950. Coupled to both links 940 and 945, the optical switch 950 is configured to select one of the outgoing light signals received over links 940 and 945 based on a number of parameters such as those described above.

Figure 15:
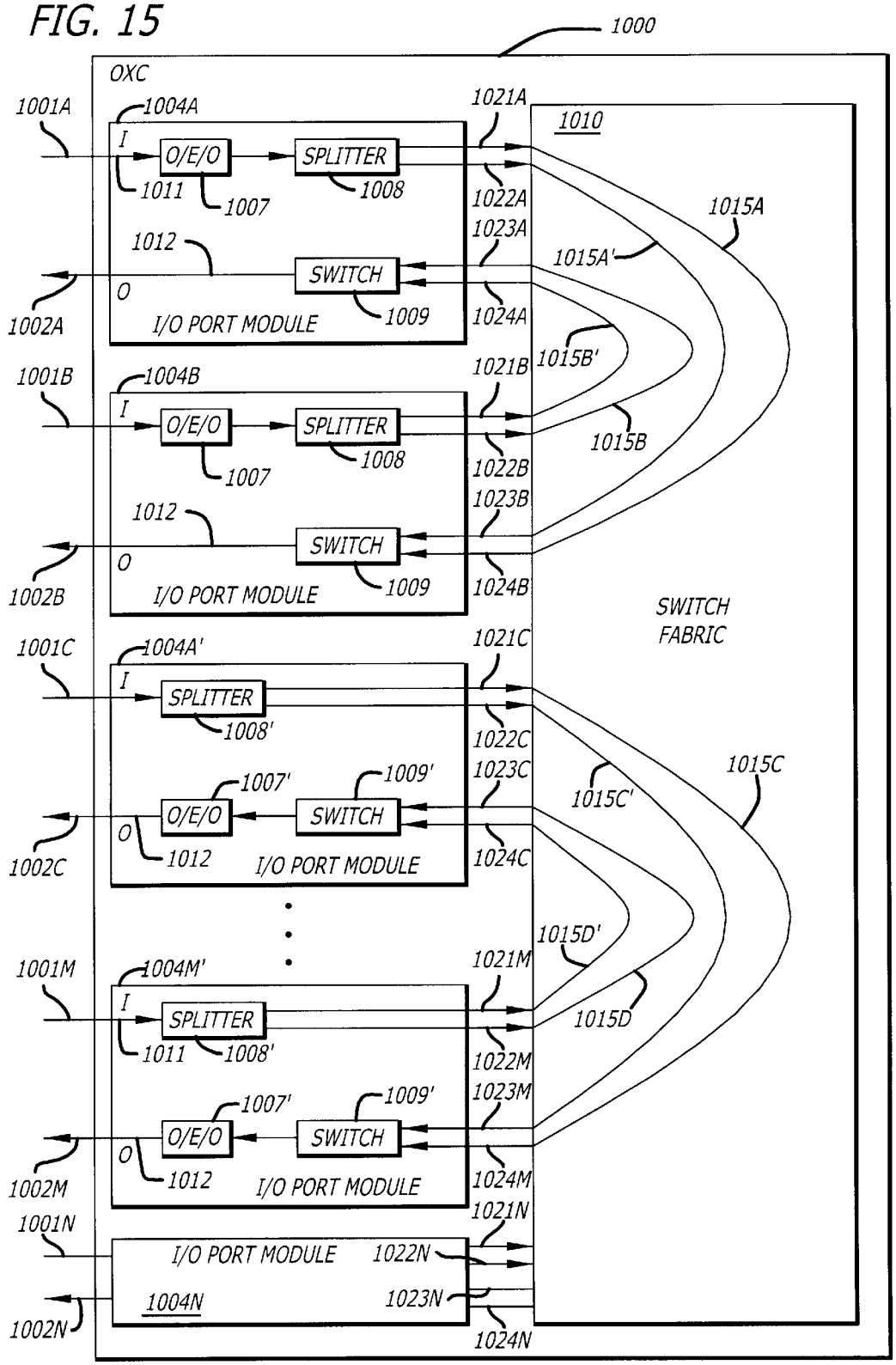
FIG. 15 is a third exemplary embodiment of a bridging technique associated with an optical cross-connect switching system.

Referring now to FIG. 15, a third exemplary embodiment of a bridging technique associated with an optical cross-connect switching system is illustrated. The optical cross-connect switching system (OXC) 1000 comprises one or more optical input ports 1001 A–1001 N and one or more optical output ports 1002A–1002N provided by the various I/O port modules. The optical cross-connect switching system 1000 includes I/O port modules 1004A–1004N and 1004A'–1004M' that provide bridging for the switch fabric 1010. Bridging means that at least two optical paths are provided between I/O port modules carrying the same light signals. The switch fabric 1010 illustrates exemplary optical signal paths 1015A–1015D and redundant optical signal paths 1015A'–1015D'. If one optical path fails in the switch fabric 1010, the redundant optical path in the switch fabric 1010 continues to handle the data carried by the light signals. For example, if the optical path 1015A fails in the switch fabric 1010, the optical path 1015A' continues to carry the light signals. The redundant optical path 1015A' can be thought as bridging a gap in the optical path 1015A when it fails.

An optical path (fiber break) or the generation of light signals in an optical path (component failure) can fail, terminating the light signal completely or generating bit errors at a high rate over that of the other light signal or optical path. By monitoring the light signal inputs and/or outputs from the optical cross-connect switching system 1000, for example, a determination can be made whether to switch from one light signal in one optical path to another. The optical path and/or light signal in the optical path can fail for a variety of reasons including one or more faulty components or a failure in control.

To generate a redundant optical path in the optical cross-connect switching system 1000, an incoming light signal is input into an input port such as input port 100 IA. In one type of I/O port module, illustrated as I/O port module 1004A–1004N (generally referred to as 1004), the incoming light signal is coupled into an optical-to-electrical-to-optical "O/E/O" converter 1007 (referred to as "O/E/O") in the input optical path 1011. The O/E/O 1007 converts the light signal into an electrical signal, which is then converted back into a light signal. The electrical signal is used to monitor the incoming light signals.

In general, the O/E/O 1007 is coupled to an optical splitter 1008 to split the incoming light signal into at least two outgoing light signals on at least two (split) optical paths 1021A and 1022A. The optical splitter 1008 can be used to split the light signal into more than two split optical paths to provide greater redundancy and reliability if desired but is typically not needed. The optical splitter 1008, in one embodiment, is a passive optical coupler. While the data signal or pulses of light of the split light signals are the same, the energy level of the incoming light signal can be split equally or unequally into the at least two light signals on the at least two split optical paths 1021 A and 1022A.

The at least two split optical paths 1021A and 1022A proceed to the switch fabric 1010 and switched to another I/O port module respectively over the optical paths 1015A and 1015A' for example. The redundant light signals in the optical paths 1015A and 1015A' are routed into a switch 1009 of the I/O port module 1004B for example over the split paths 1023B and 1024B, respectively. The switch 1009 is an optical switch. As its output, the switch 1009 selects between the at least two outgoing light signals routed over split optical paths 1015A and 1015A'. The selected output of the switch 1009 is routed into the optical output path 1012 of the I/O port module 1004B and the output port 1002B of the optical cross-connect switching system 1000. In the case that one of the two light signals over split optical paths 1015 and 1015A' fails or has errors, the switch 1009 can select the alternate optical path as its output to overcome the path failure or the errors.

In another type of I/O port module, illustrated by I/O port modules 1004A'–1004M' (generally referred to as 1004'), an incoming light signal at the input port 1001C is first routed into a splitter 1008' in the optical input path 1011. The incoming light signal is split by the splitter 1008' into at least two light signals routed over at least two (split) optical paths 1021C and 1022C for example. The at least two light signals on the at least two split optical paths 1021C and 1022C are then provided to the switch fabric 1010 for switching. In the switch fabric 1010, the split light signals are routed over different optical paths such as optical paths 1015C and 1015C'. The split light signals over optical paths 1015C and 1015C' are routed into the same switch of an I/O port module such as switch 1009' of the I/O port module 1004M' via the optical paths 1023M and 1024M for example.

As shown, the switch 1009' is an optical switch. As its output, the switch 1009' selects between the at least two light signals in the at least two split optical paths 1015C and 1015C' for example. The selected output of the optical switch 1009' is routed into the optical output path 1012 of the I/O port module 1004M' and the output port 1002M of the optical cross-connect switching system 1000. In the case that one of the two light signals in the at least two split optical paths fails or has errors, the optical switch 1009' can select the alternate optical path as its output to overcome the path failure or the errors. The output of the optical switch 1009' is coupled into the O/E/O 1007' on the I/O port module 1004M' for regenerating the light signals. With the O/E/O 1007' in the output path, regeneration is performed post split. In this manner, the O/E/Os do not need to be duplicated in the input path and output path for each connection of a communication channel over the optical cross-connect switching system 1000.

The monitoring provided by the O/E/Os 1007 and 1007' in the I/O port modules 1004A–1004N and 1004A'–1004M' in the optical cross-connect switching system 1000, assist in the selection between the at least two light signals in the at least two split optical paths by the optical switches 1009 and 1009', respectively. If the monitoring determines that there is no signal at the output of the optical switch 1009' and it is known that there should be a signal present, the optical switch 1009' can select the alternate path. If the monitoring determines that there is an incoming light signal into the splitter 1008 and it is known that it should be present at the output of the optical switch 1009, the alternate path can be selected.

In either case, the I/O port modules of the optical cross-connect switching system 1000 of FIG. 15 split the incoming light signal at an input port into at least two (split) outgoing light signals to propagate over two different optical paths and provide redundancy in how the data signal is routed over the switch fabric 1010. The I/O port modules then select which of the at least two (split) Outgoing light signals to route into an output port of the optical cross-connect witching system 1000.

Figure 16:
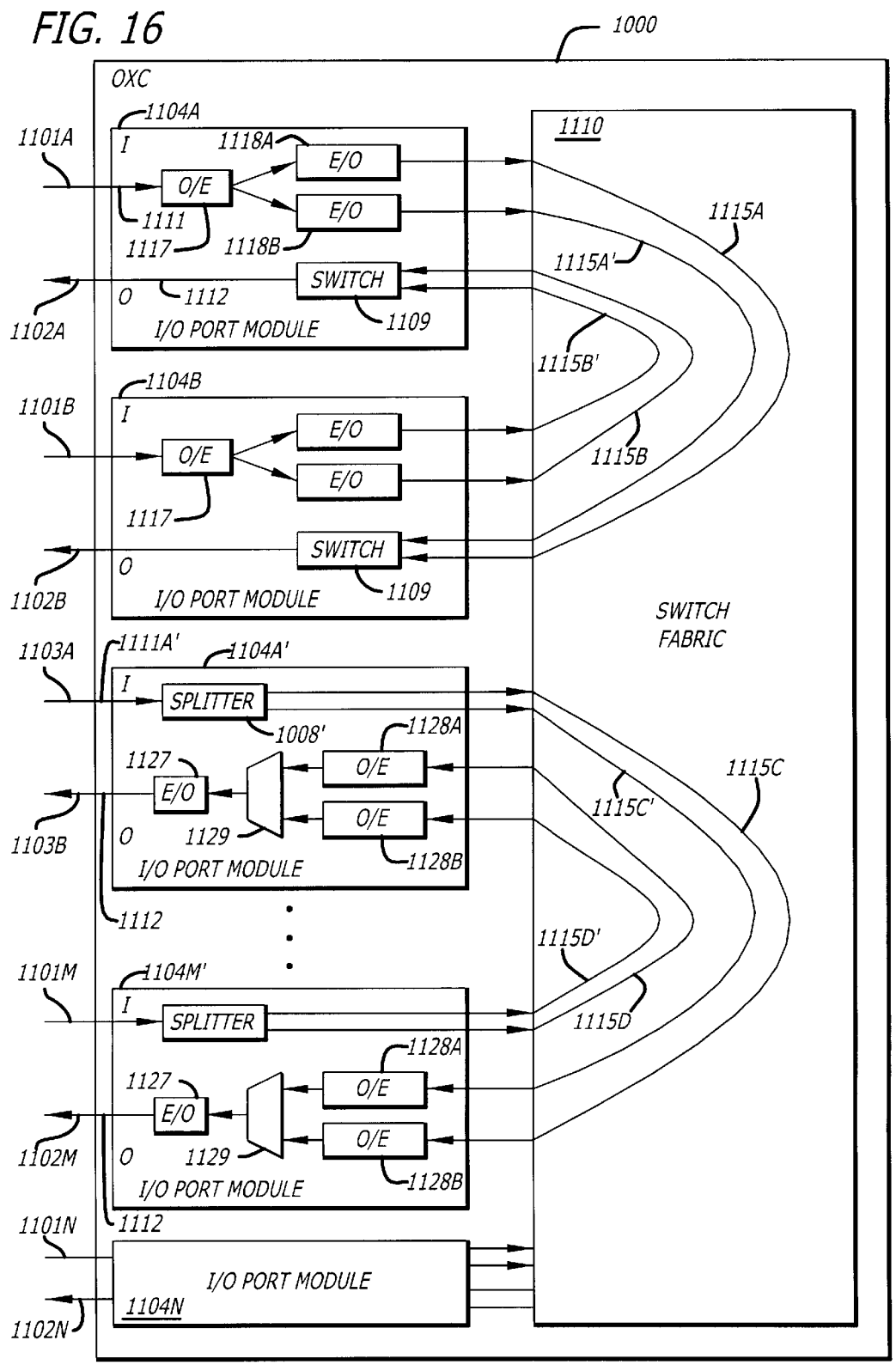
FIG. 16 is an exemplary block diagram of an optical cross-connect switching system utilizing the bridging technique.

Referring now to FIG. 16, a block diagram of an optical cross-connect switching system 1000 is illustrated. The optical cross-connect switching system 1000 is an alternate embodiment to provide bridging over a switch fabric 1110. The optical cross-connect switching system 1000 has one or more optical input ports 1101–1101N and one or more optical output ports 1102A–1102N provided by the various I/O port modules.

Using one type of I/O port module, an incoming light signal 1111 is first converted from a light signal in the optical domain into an electrical signal in the electrical domain and fanned out (e.g., electrically split into two equal electrical signals) by coupling to two optical transmitters 11118A and 1118B (e.g., an electrical-to-optical "E/O" converter such as a semiconductor laser). The two optical transmitters 1118A and 1118B convert in parallel the electrical signal into two light signals in the optical domain. The two light signals generated by the two optical transmitters 1118A and 1118B are substantially similar.

The two light signals are then routed through the switch fabric 1110 through differing optical paths 1115A and 1115A'. A selection is then made at the output of the switch fabric 1110 between the two light signals in order to generate the output light signal 1112 from the optical cross-connect switching system 1000. If one path of the two light signals should fail, the opposite path is selected.

Using another type of I/O port module, namely I/O port module 1104A', . . . , or 1104M', the incoming light signal is optically split into two split light signals which are routed over the switch fabric 1110. At the output of the switch fabric 1110, the two (split) light signals in the optical domain are coupled into two optical receivers 1128A and 1128B (each an optical to electrical "O/E" converter such as a photodiode) to convert them into two electrical signals respectively in the electrical domain. The two electrical signals are then coupled into multiplexer 1129 to electronically select which one of the two should be transmitted out the output port 1102M of the optical cross-connect switching system 1000 by an optical transmitter 1127 (e.g., an E/O converter such as a semiconductor laser). The optical transmitter 1127 converts the selected electrical signal in the electrical domain into a light signal in the optical domain.

As shown in FIG. 16, the optical cross-connect switching system 1000 can include one or more I/O port modules 1104A–1104N and/or one or more I/P port modules 1104A'–1104M'. In either case, the I/O port modules provide two different optical paths through the optical switch fabric 1110 for the same communication channel connection. For example, optical paths 1115A–1115D are one path for the communication channels while optical paths 1115A'–1115D'are another both carrying the same data signals. If one optical path should fail generating a gap in the connection, the other path is selected to bridge the gap and to allow a continuous flow of data for the given communication channel connection. Bridging in this manner increases the reliability of the optical cross-connect switching system 1000.

The I/O port modules 1104A–11104N include an optical receiver 1117 (e.g., an O/E converter such as a photodiode) which is coupled to a pair of optical transmitters 1118A and 1118B (e.g., an electrical-to-optical "E/O" converter such as a semiconductor laser) in the input path 1111. Thus, in the input path 1111 of the I/O port modules 1104A–1104N, an optical-electrical-optical conversion (O/E/O) is performed. In the output path 1112, the I/O port modules 1104A–1104N include an optical switch 1109 to select between two light signals. The optical transmitters 1118A and 1118B generate the two parallel light signals that are routed over two paths in the switch fabric 1110 such as optical paths 1115A and 1115A'. The optical switch 1109 selects between the two parallel light signals to generate one as the output of the optical cross-connect switching system 1000 on an output port. If the selected path should fail, the optical cross-connect switching system 1000 switches to the other light signal carried over the other optical path.

The I/O port modules 1104A'–1104M' include an optical splitter 1108 in the input path 1111 to split the incoming light signal into two (split) outgoing light signals. The two outgoing light signals are routed to the switch fabric 1110 over two separate optical paths. For example, the I/O port module 1104A' would be coupled for routing the split, outgoing light signals over optical paths 1115C and 1115C' of the switch fabric 1110. In the output path 1112, the I/O port module 1104A'–1104M' include the pair of optical receivers 1128A and 1128B, the multiplexer 1129, and the optical transmitter 1127 as previously described.

The pair of optical receivers 1128A and 1128B (e.g., an O/E converter such as a photodiode) receive the (split) light signals routed over the two separate optical paths 1115C and 1115C'. A benefit of locating these receivers after the switch fabric(s) 1110 is that they can accept a full range of wavelengths of photons due to dual wave-length division multiplexed (DWDM) light signals. The wide range of wavelengths of light signals over the optical paths in the optical cross-connect switching system 1000 can exist due to DWDM. Being able to cross-connect any light signal to the O/E/O over a range of wavelengths is desirable to provide wavelength conversion/translation in the optical cross-connect switching system 1000.

Another benefit is that if some negative optical conditions or negative timing parameters exist in the cross connected light signal from the switch fabric, such as low optical power, wrong wavelength, poor spectral quality, overpower, etc. within the cross-connect switching system, it can be isolated by the O/E/O before being output to the network. The split light signals are converted into two electrical signals by the optical receivers 1128A and 1128B and routed into the multiplexer 1129. The two electrical signals can also be monitored locally to determine which should be selected to generate the output light signal. It can also be forced to switch by means of external communication control, if external monitoring methods are employed. The multiplexer 1129 electronically selects one of the two electrical signals to be coupled into the optical transmitter 1127 (an E/O converter such as a semiconductor laser). If the two signals being selected from have the same data and protocol, as expected, it is envisioned that the monitored switching between the two within the multiplexer 1129 could be hitless, i.e. produce no errors on the selected electrical signal. This behavior is very beneficial to bridge and roll applications and those that have Forward-Error-Correction data encoding schemes. This would also apply to SONET and SONET like data streams as well as those employing a 'wave wrapper' protocol. The optical transmitter 1127 converts the selected electrical signal in the electrical domain into a light signal in the optical domain for transmission out over the output port 1112 of the optical cross-connect switching system 1000. Thus, in the output path 1112 of the I/O port module 1104A'–1104M', an optical-electrical-optical conversion (O/E/O) is performed.

Bridging in this manner provides that if an optical path or a component in the path fails, the other path and components can handle the data flow over the communication channel in the optical cross-connect switching system 1000. A disadvantage to the bridging provided by the different embodiments of the optical cross-connect switching system 1000 of FIGS. 15 and 16 is that fewer communication channels can be supported because of the redundant optical paths formed in the switch fabrics 1010 and 1110 respectively. One way to alleviate this problem is to use a redundant switch fabric to provide the redundant path.

VI. 1:K Protection Scheme for Equipment Redundancy

As previously described above, one technique for providing equipment redundancy is to implement two or more switch fabrics, each receiving a bridged, light signal. A better copy (higher power level) of the bridged, light signals is selected as the output light signal. Alternatively, as shown in FIG. 17, if a single optical switch (or switch port) is more likely the cause for failure than the entire switch fabric 1300, then a 1:K protection scheme may be employed.

Herein, for every K switch ports $1310_1$–$1310_K$, an additional switch port. 1320 of the switch fabric 1300 is designed as a spare port. For this embodiment, "K" is a positive whole number. The particular value for K is based on a design choice and the selected degree of switch reliability for the optical cross-connect switching system. For example, a maximum redundancy is where one or more additional ports are reserved for each switch port. A minimum redundancy is where one additional switch port is reserved for a large number of switch ports.

Figure 17:
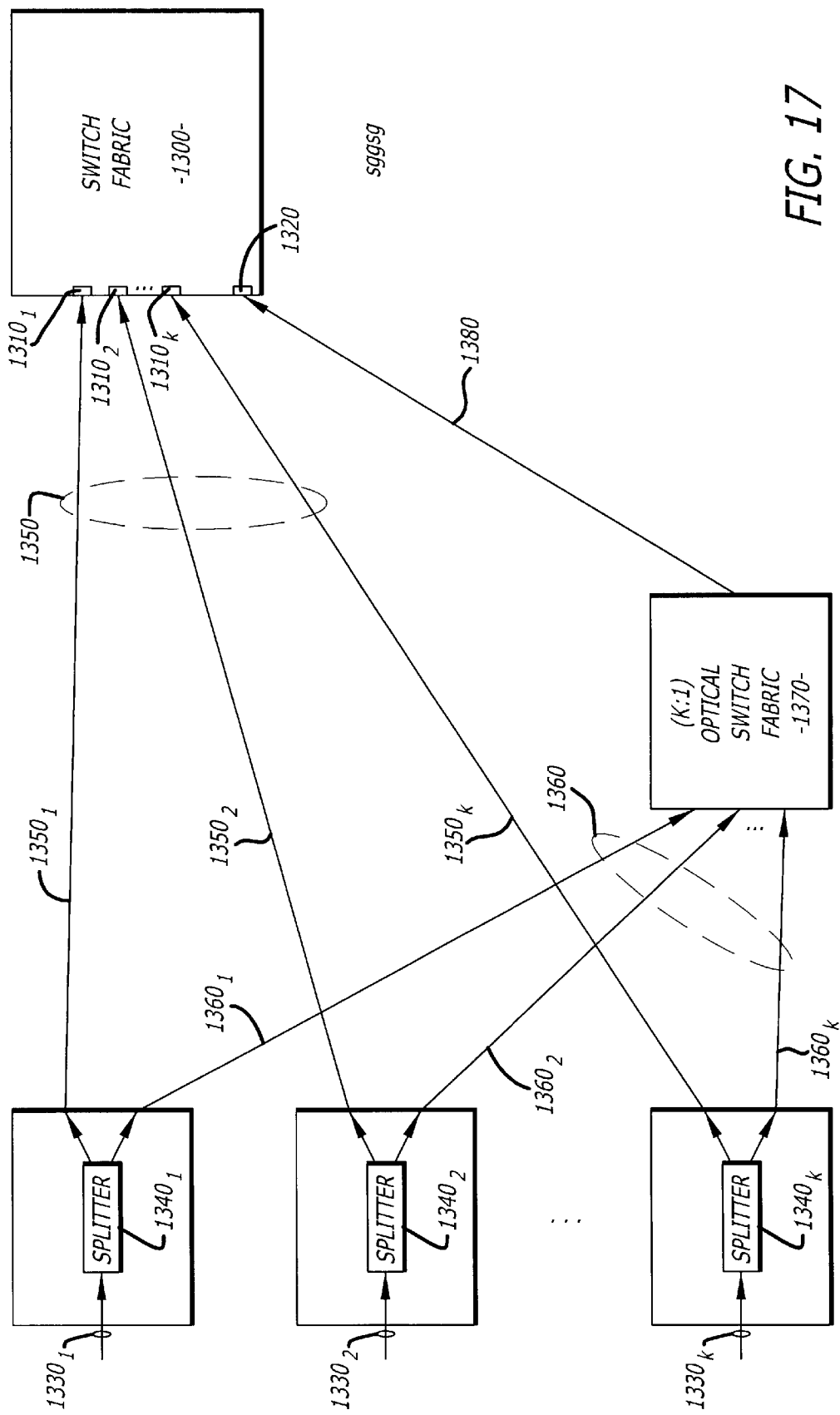
FIG. 17 is an exemplary block diagram of a 1:K Protection Scheme for equipment redundancy.

As further shown in FIG. 17, K incoming light signals along input optical paths $1330_1$–$1330_K$ are bridged by splitters $1340_1$–$1340_K$ within one or more I/O port modules. Based on an incoming light signal, one outgoing light signal is routed along a primary optical path 1350, represented by optical paths $1350_1$–$1350_K$, to corresponding switch ports $1310_1$–$1310_K$ of the switch fabric 1300. The other outgoing light signal is routed along a secondary optical path 1360, represented by optical paths $1360_1$–$1360_K$, to a corresponding port of an optical (K:1) switch fabric 1370. The optical switch fabric 1370 includes K switch inputs and one switch output that is coupled to additional switch port 1320 via link 1380.

In accordance with the switching architecture described above, in the event that one of the optical switches associated with the primary optical path $1350_1$–$1350_K$ fails, a decrease in power is sensed from the routed light signal. This decrease in power is used to trigger the change from the switch port $1310_1$, . . . $1310_K$ associated with the failed optical switch to the additional switch port 1320.

VII. Test Access Functionality

Test access is a function by which a signal flowing through an optical switch can be monitored in a non-intrusive manner through a switch port designated for this purpose. Herein, certain embodiments for performing test access are described, although it is contemplated that other embodiments may be developed in accordance with the spirit of the invention.

Figure 18:
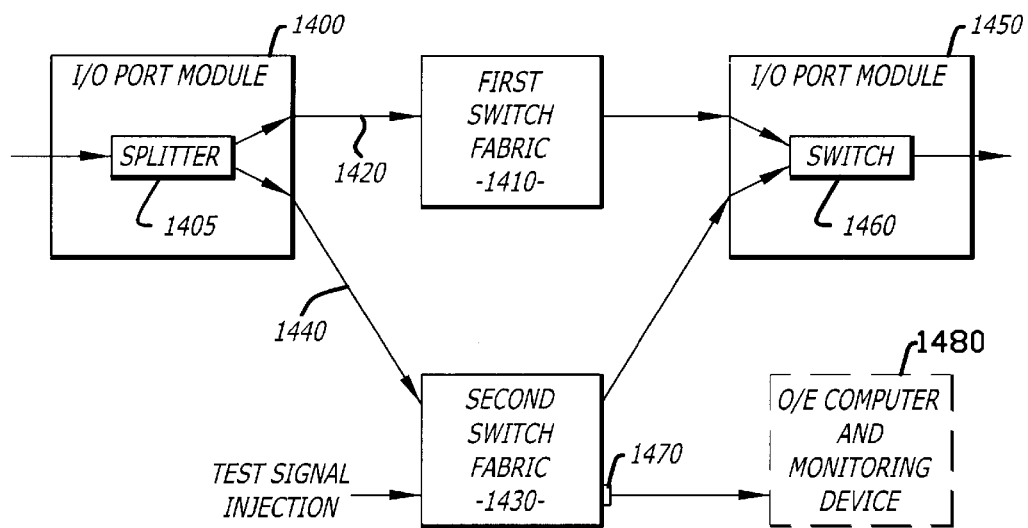
FIG. 18 is a first exemplary embodiment for providing test access functionality through redundancy.

Referring now to FIG. 18, a first exemplary embodiment for providing test access functionality through redundancy is shown. An incoming light signal is bridged by a splitter 1405 at a source I/O port module 1400 to produce a first and second outgoing light signals. The first outgoing light signal is routed to a first switch fabric 1410 via link 1420 while the second outgoing light signal is routed to a second switch fabric 1430 via link 1440. Herein, in one embodiment, the first switch fabric 1410 is part of a first optical switch core. The second switch fabric 1430 is part of a second optical switch core.

Shown as an illustrative example, the first outgoing light signal is selected by a switch 1460 at a destination I/O port module 1450 to be output. The other light signal, namely the second outgoing light signal, is routed to a test access port 1470 associated with the second optical switch 1430. Furthermore, an input port on the second optical switch 1430 can also be dedicated to test signal injection for further testing functionality. An O/E monitoring device 1480 may be coupled to the test access port 1470 (as represented in dashed lines) to analyze the incoming light signal and perhaps the operations of the second optical switch 1430 itself.

Figure 19:
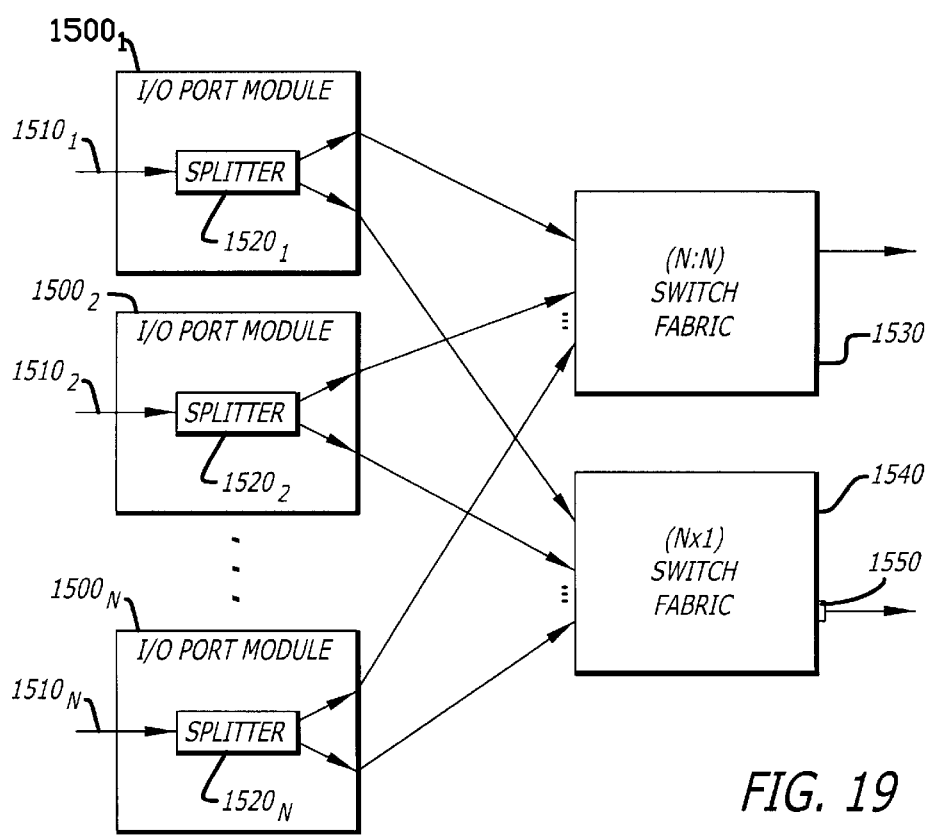
FIG. 19 is a second exemplary embodiment for providing test access functionality through additional switching.

Referring to FIG. 19, a second exemplary embodiment for providing test access functionality through additional switching is shown. Herein, incoming light signals over input paths $1510_1$–$1510_N$ are routed through I/O port modules $1500_1$–$1500_N$. More specifically, the incoming light signals are bridged by splitters $1520_1$–$1520_N$ of the I/O port modules $1500_1$–$1500_N$ and one output of each I/O port module $1500_1$–$1500_N$ is sent into a (N×N) switch fabric 1530. All other outputs are routed to a unique switch port of a N×1 switch fabric 1540. The N×1 switch fabric 1540 features a single output port 1550 being designated as the test access port. An O/E converter and monitoring device may be coupled to the test access port 1550 to analyze the light signals routed from splitters $1520_1$–$1520_N$. This N×1 switch fabric 1540 could potentially also be part of the larger switch core.

Referring now to FIGS. 20A–20G and 21, block diagrams of exemplary embodiments of an optical cross-connect switching system 1000 utilizing a test access port is illustrated. The optical cross-connect switching system 1000 include I/O port modules 1604–1604N that provide bridging by using two (optical) switch fabrics (also referred to as optical switch cores) 1610A and 1610B. An incoming signal is split into at least two bridged, light signals with one portion being routed into one switch fabric 1610A with another portion of the signal being routed into the other switch fabric 1610B. While one switch fabric 1610A acts as the "active" switch fabric, the other switch fabric 1610B acts as a "redundant" switch fabric. Providing a redundant switch fabric also provides reliability in case there is a problem in control of one of the switch fabrics.

Furthermore, the redundant switch fabric 1610B provides hot swapability in that while one is having its switch fabric or other control systems updated or replaced, the other can continue to provide optical switching. The optical cross-connect switching system 1000 also includes a test port/monitor module 1605 to test and monitor the optical paths through the two switch fabrics 1610A and 1610B in order to detect equipment or facility failures.

Figure 20A:
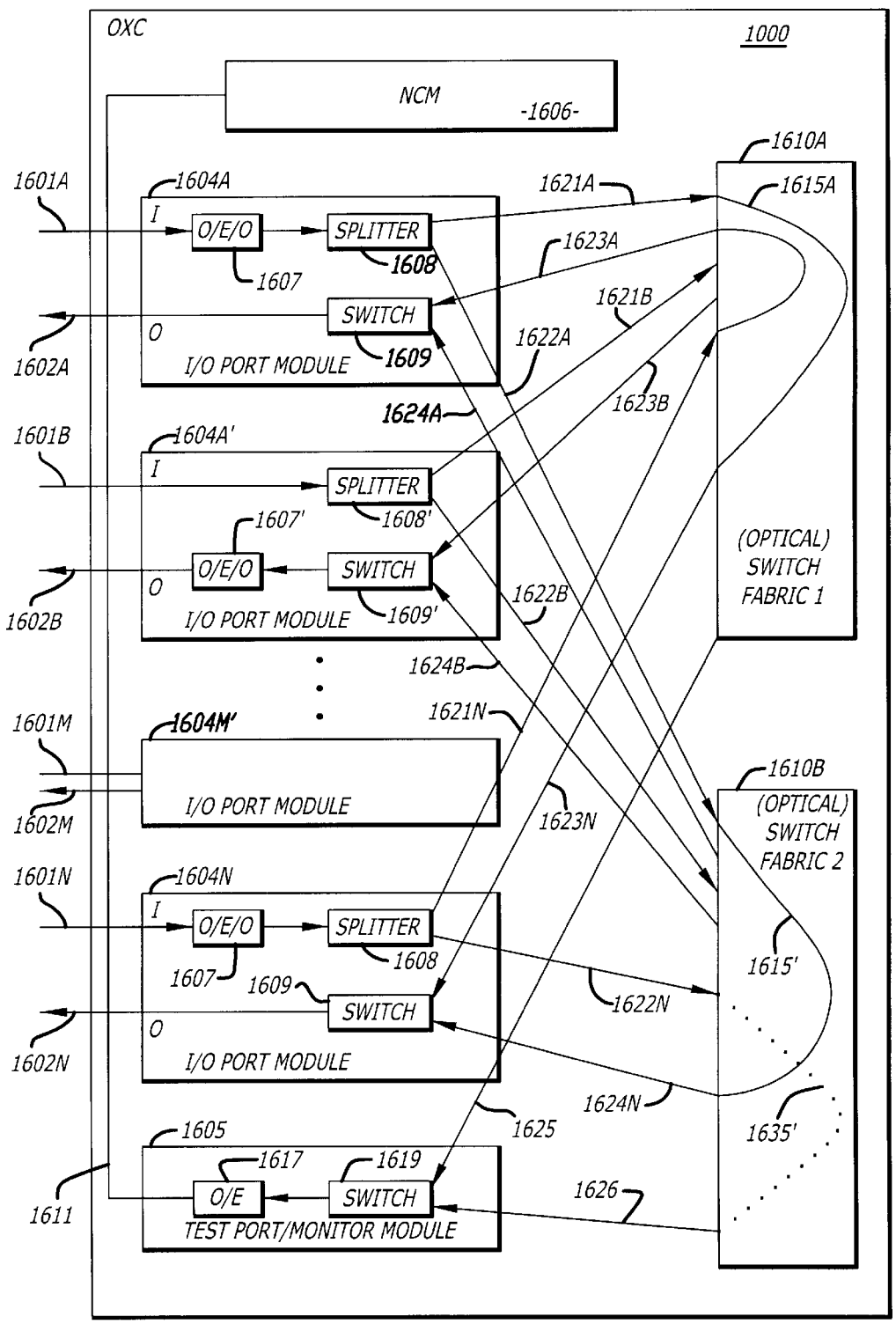
FIGS. 20A–20G are exemplary embodiments of an optical cross-connect switching system utilizing a first type of test port/monitor module.

More specifically, as shown in FIG. 20A, the optical cross-connect switching system 1000 includes the first switch fabric 1610A, the second switch fabric 1610B, and one or more I/O port modules. These I/O port modules provide one or more optical input ports 1601A–1601N and one or more optical output ports 1602A–1602N as shown. The optical cross-connect switching system 1000 can also includes one or more different types of I/O port modules such as one or more I/O port modules 1604A–1604N (generally referred to as 1604) and/or one or more I/O port modules 1604A'–1604M' (generally referred to as 1604'). The optical cross-connect switching system 1000 can also include one or more test port/monitor modules 1605.

The I/O port modules 1604A–1604N provide an O/E/O converter (referred to as "O/E/O") 1607 in their input paths while the I/O port modules 1604A'–1604M' provide an O/E/O 1607' in their output paths. The I/O port modules 1604A–1604N and 1604A'–1604M' each have an optical splitter 1608 and 1608' respectively in their input paths. The I/O port modules 1604A–1604N and 1604A'–1604M' each have an optical switch 1609 and 1609' respectively in their output paths. The O/E/Os 1607 and 1607', optical switches 1609 and 1609', and the optical splitters 1608 and 1608' are optically coupled together within the I/O port modules 1604A–1604N and 1604A'–1604M' as shown and illustrated in FIGS. 20A and 20B.

In either type of I/O port modules 1604 or 1604', the optical splitter 1608 or 1608' splits the incoming light signal into at least two outgoing light signals. These outgoing light signals are routed over different optical paths, one of which is routed to the first switch fabric 1610A and the other which is routed to the second switch fabric 1610B. In either type of I/O port modules 1604 or 1604', the optical switch 1609 and 1609' selects a light signal from the two outgoing lights signals having the better signal quality over two differing optical paths, one of which is received from the first switch fabric 1610A and the other of which is received from the second switch fabric 1610B. In this manner, should an optical path in one of the two switch fabrics 1610A or 1610B fail for any reason, the optical switch 1609 or 1609' only need select the opposite signal path.

For example, as an illustration, consider the exemplary optical path 1615A in the first switch fabric 1610A and the optical path 1615A' in the second switch fabric 1610B. The splitter 1608 in the I/O port module 1604A splits an incoming light signal into at least two outgoing light signals on optical paths 1621A and 1622A. The light signal on the optical path 1621A is routed into the first switch fabric 1610A and the signal on the optical path 1622A is routed into the second switch fabric 1610B. The switch fabrics 1610A and 1610B route these light signals over exemplary optical paths 1615A and 1615A' respectively.

The optical path 1615A in the switch fabric 1610A is coupled into the optical path 1623N which is coupled into the optical switch 1609 of the I/O port module 1604N. The optical path 1615A' in the switch fabric 1610B is routed to the optical path 1624N, which in turn is routed into the optical switch 1609 of the I/O port module 1604N. In one case, the optical switch 1609 of the I/O port module 1604N selects the light signals over the optical path 1615A so that the first switch fabric 1610A is acting as the active switch fabric.

In another case, the optical switch 1609 of the I/O port module 1604N selects the light signals over the optical path 1615A' so that the second switch fabric 1610B is acting as the active switch fabric. If either optical switch fabric fails generating a gap, the other is automatically selected by the I/O port modules to bridge the gap.

For this illustration, light signals from the I/O port module 1604A are coupled into the I/O port module 1604N such that only one O/E/O 1607 is needed to regenerate the light signals input into the optical cross-connect switching system 1000. If it is desirable to regenerate light signals into as well as out of the optical cross-connect switching system 1000, light signals from one of the I/O port modules 1604A–1604N can be coupled into one of the I/O port modules 1604A'–1604M' which have an O/E/O 1607' to regenerate the output light signals in the output path.

Other I/O port modules can be used with more than one switch fabric to provide redundancy. FIGS. 20B–20G illustrate exemplary embodiments of other combinations of I/O port modules that can be used with the two (optical) switch fabrics 1610A and 1610B.

Figure 20B:
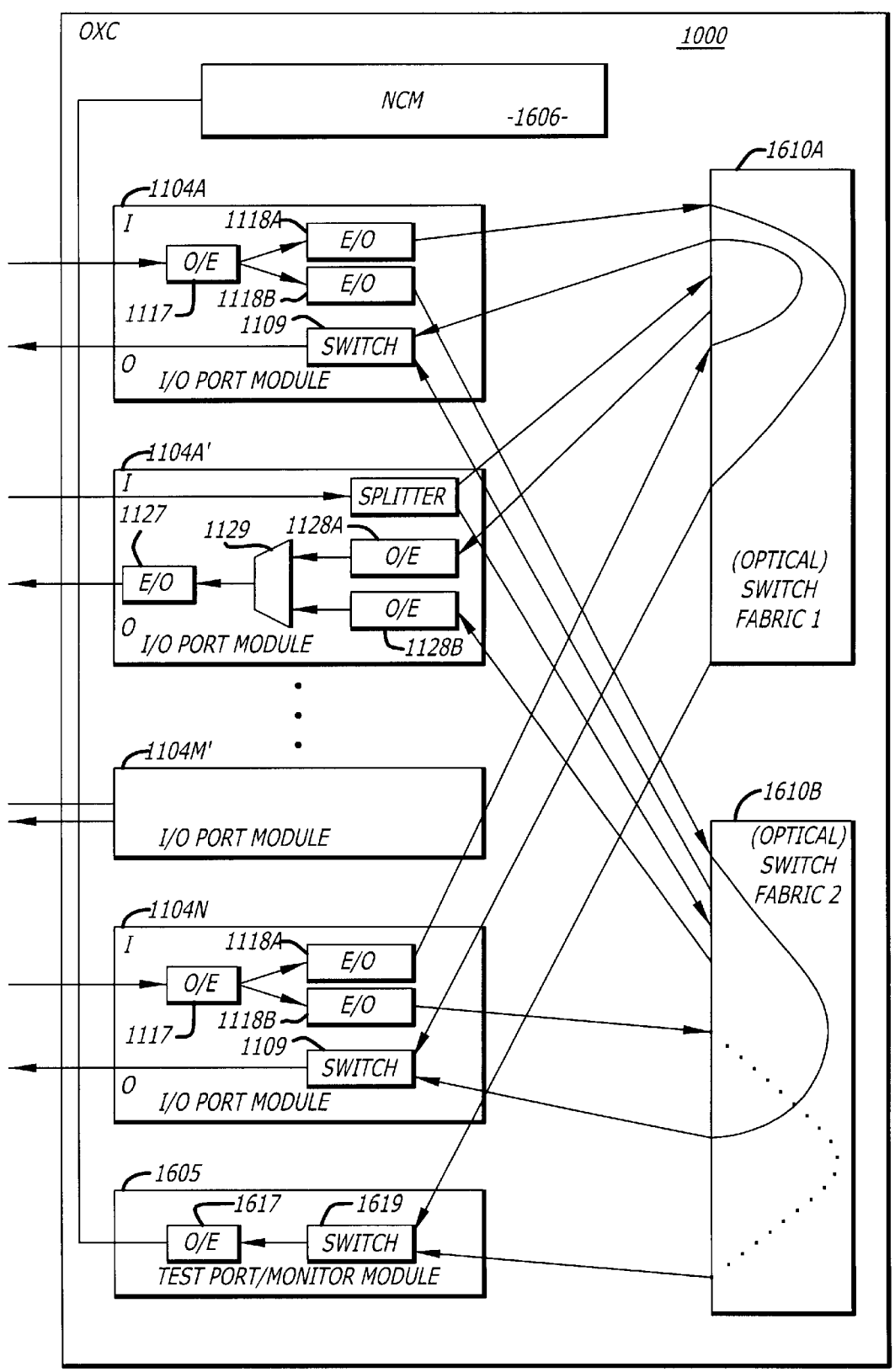

Referring now to FIG. 20B, the cross-connect switching system 1000 includes I/O port modules 1104A–1104N, I/O port modules 1104A'–1104M', test port/monitor module 1605, network control module (NCM) 1606, first (optical) switch fabric 1610A, and second (optical) switch fabric 1610B. The elements of I/O port modules 1104A–1104N and I/O port modules 1104A'–1104M' were previously discussed with reference to FIG. 16. The optical cross-connect switching system 1000 provides redundancy but uses differing I/O port modules having different components.

Figure 20C:
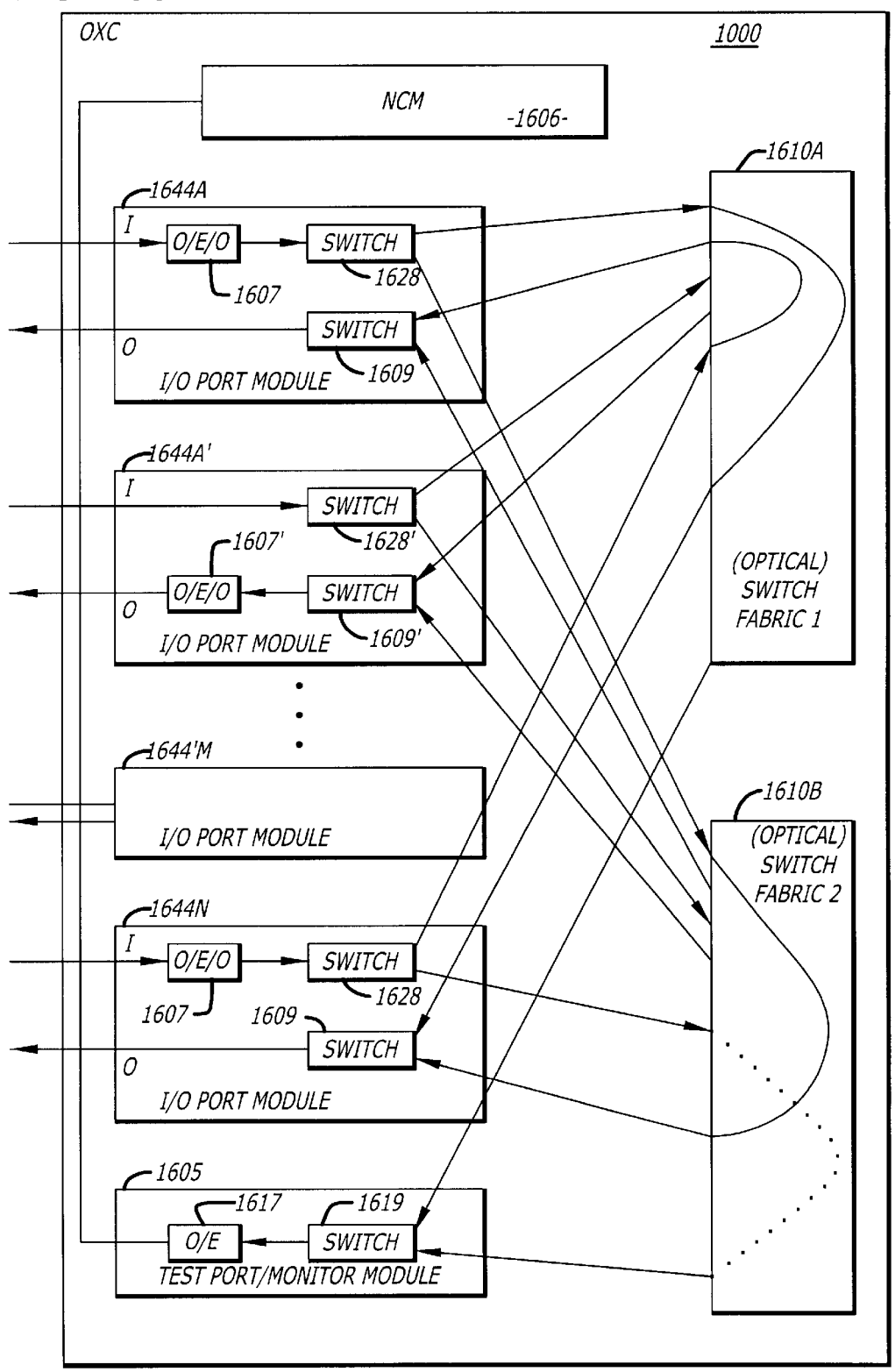

Referring now to FIG. 20C, the optical cross-connect switching system 1000 includes I/O port modules 1644A–1644N, I/O port modules 1644A'–1644M', test port/monitor module 1605, network control module (NCM) 1606, first switch fabric 1610A, and second switch fabric 1610B. I/O port modules 1644A–1644N and I/O port modules 1644A'–1644M' utilize optical switches 1628 and 1628' as opposed to splitters 1608 and 1608' in I/O port modules 1604A–1604N and 1604A–1604M' respectively which were previously described. Optical switches 1628 and 1628' provide less optical power loss than the splitters 1608 and 1608' so that a stronger light signal can be routed through the switch fabric.

Figure 20D:
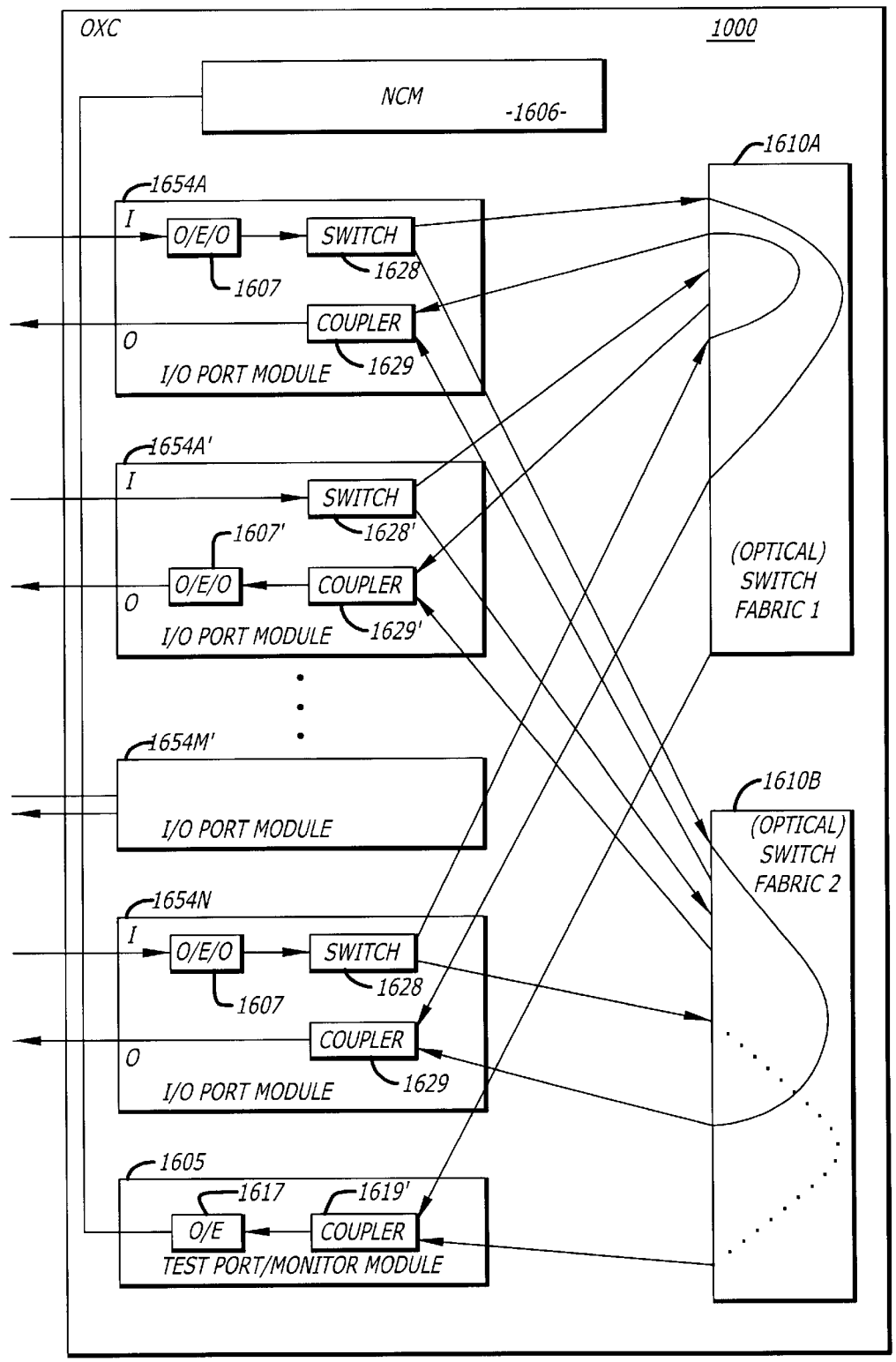

Referring now to FIG. 20D, the optical cross-connect switching system 1000 includes I/O port modules 1654A–1654N, I/O port modules 1654A'1654M', test port/ monitor module 1605, network control module (NCM) 1606, first switch fabric 1610A, and second optical switch fabric 1610B. I/O port modules 1654A–1654N and I/O port modules 1654A'–1654M' utilize optical switches 1628 and 1628' and optical couplers 1629 and 1629' as opposed to splitters 1608 and 1608' and optical switches 1609 and 1609' in I/O port 'modules 1604A–1604N and 1604A–1604M' respectively which were previously described. Optical switches 1628 and 1628' provide less optical power loss than the splitters 1608 and 1608'. Optical couplers 1629 and 1629' act similar to a multiplexer and can be passive so that no switching control is required.

Figure 20E:
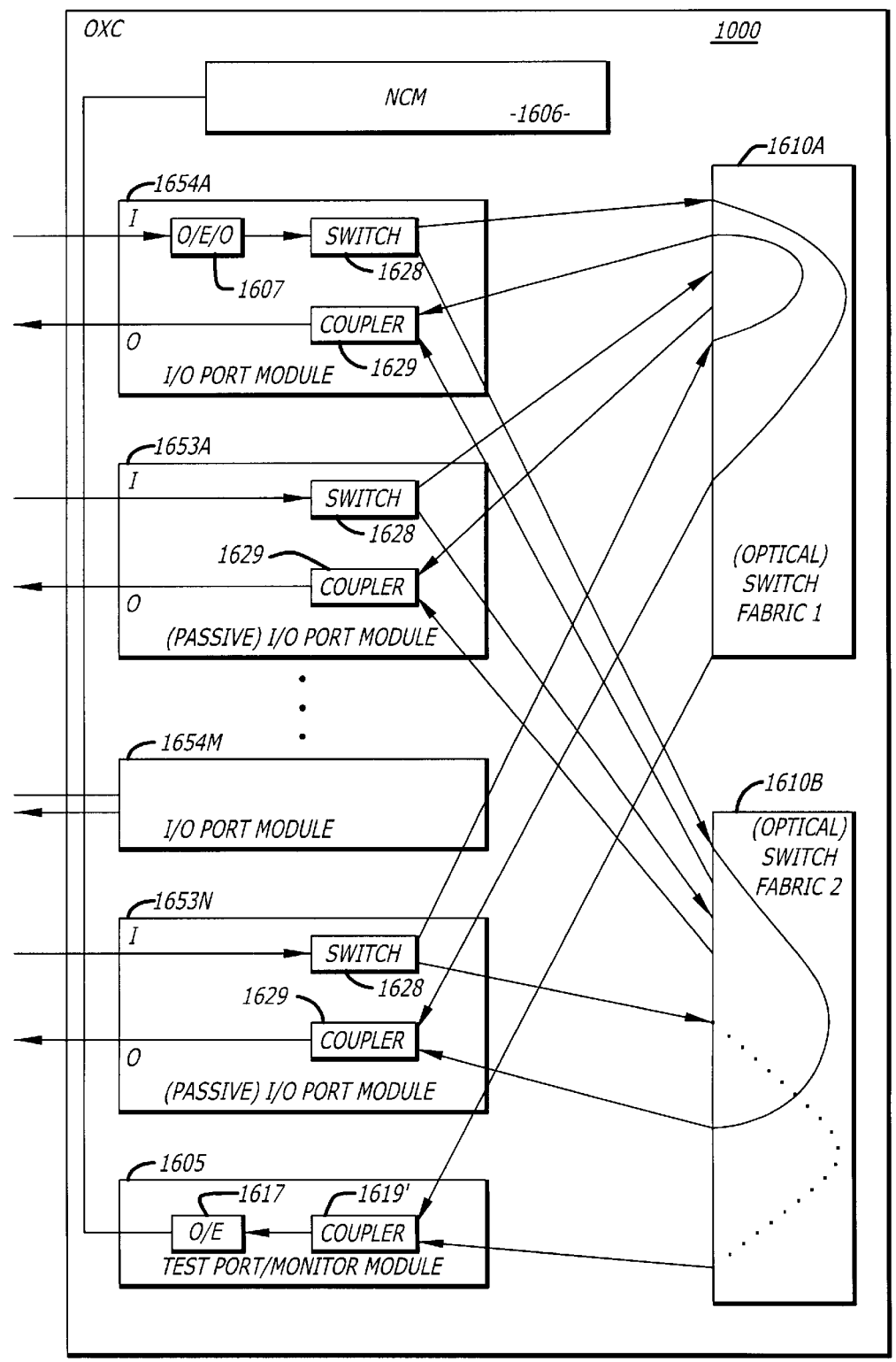

Referring now to FIG. 20E, the optical cross-connect switching system 1000 includes I/O port modules 1654A–1654M, passive I/O port modules 1653A–1653N, test port/monitor module 1605, network control module (NCM) 1606, first switch fabric 1610A, and second switch fabric 1610B. I/O port modules 1654A–1654M utilize optical switches 1628 and optical couplers 1629 as opposed to splitters 1608 and optical switches 1609 in I/O port modules 1604A–1604N respectively which were previously described. Each of the passive I/O port modules 1653A–1653N includes the optical switch 1628 in the input path and the optical coupler 1629 in the output path as shown. Each of the I/O port modules 1653A–1653N does not have an O/E/O in either its input path or its output path. That is, optical cross connect switching providing at least one redundant switch fabric can also use these types of passive I/O port modules to reduce the number of O/E/Os and lower costs.

Figure 20F:
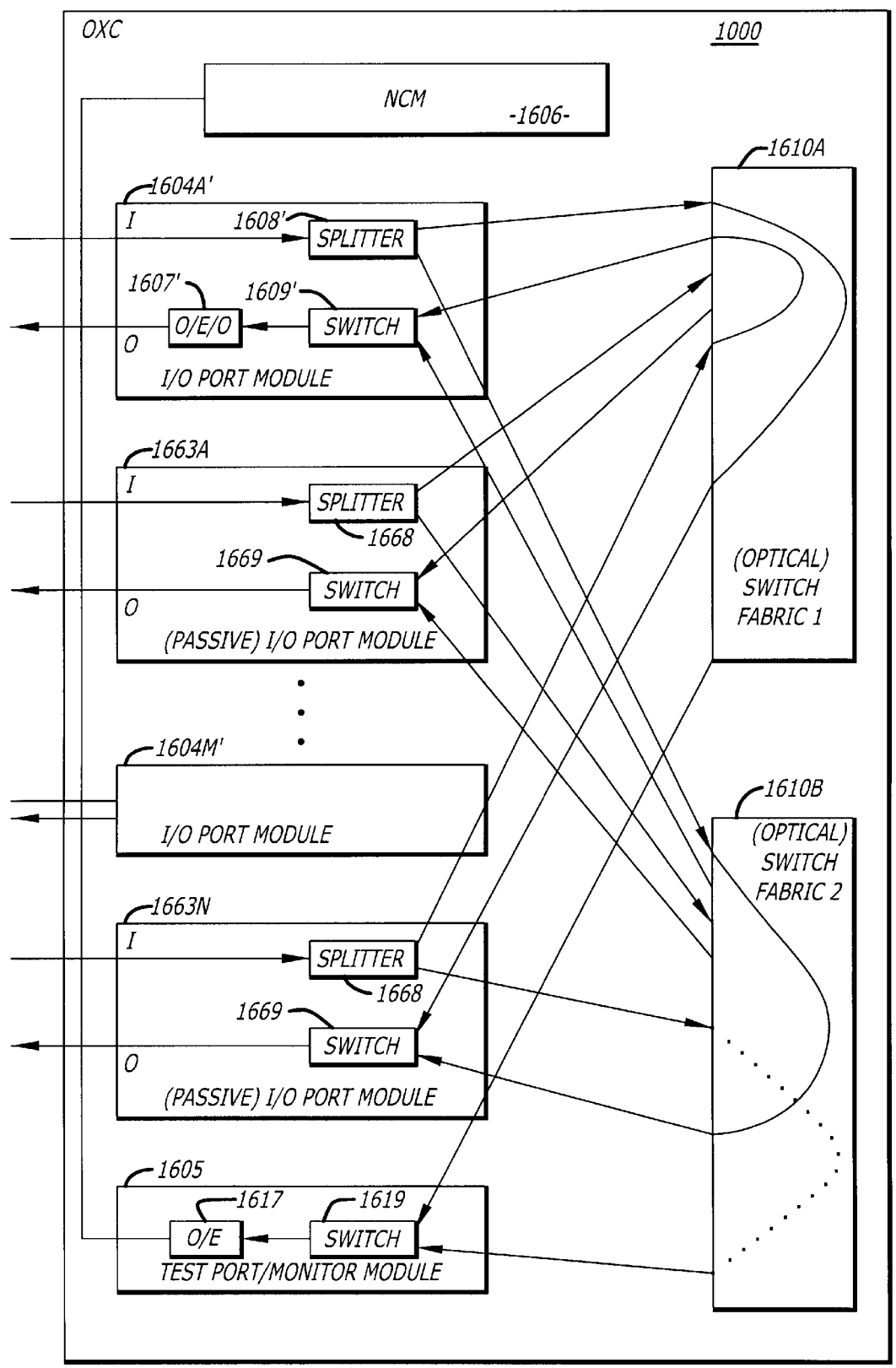

Referring now to FIG. 20F, alternate combinations of different types of I/O port modules within an optical cross-connect switching system having at least one redundant optical switch fabric is shown. In FIG. 20F, the optical cross-connect switching system 1000 includes I/O port modules 1604A'–1604M', passive I/O port modules 1663A–1663N, test port/monitor module 1605, network control module (NCM) 1606, first switch fabric 1610A, and second switch fabric 1610B. I/O port modules 1604A'–1604M' were previously described with respect to FIG. 20A. Each of the passive I/O port modules 1663A–1663N includes an optical splitter 1668 in the input path and an optical switch 1669 in the output path as shown. Each of the passive I/O port modules 1663A–1663N does not have an O/E/O in either their input path or their output path.

Figure 20G:
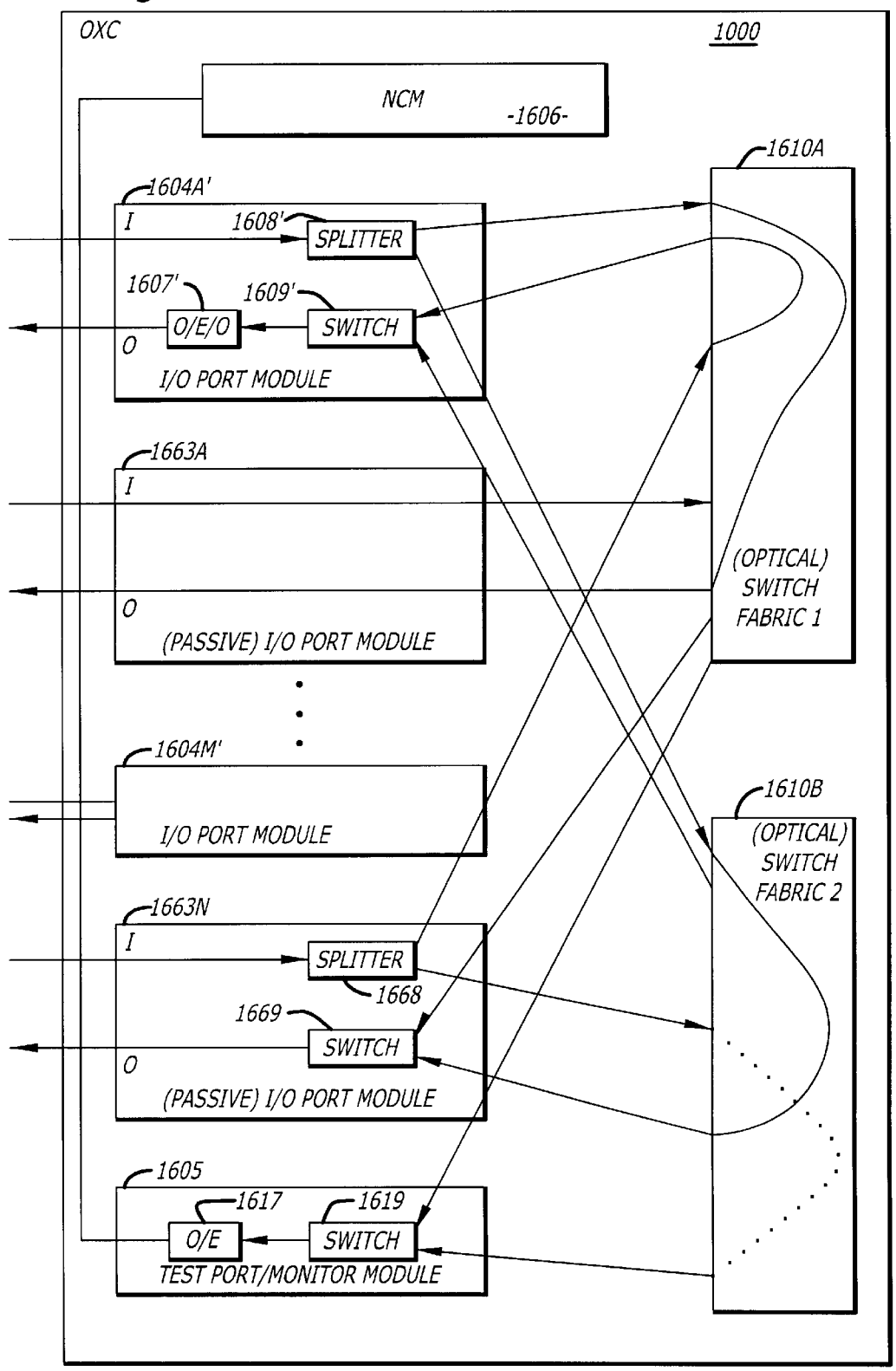

Referring now to FIG. 20G, another embodiment of combinations of different types of I/O port modules is illustrated for an optical cross-connect switching system having a redundant (optical) switch fabric. In FIG. 20G, the optical cross-connect switching system 1000 includes I/O port modules 1604A'–1604M', one or more I/O port modules 1663 and 1670, test port/monitor module 1605, network control module (NCM) 1606, first switch fabric 1610A, and second switch fabric 1610B. The I/O port modules 1604A'–1604M' were previously described with respect to FIG. 20A. The I/O port module 1663 includes an optical splitter 1668 in the input path and an optical switch 1669 in the output path as shown. The I/O port module 1670 provides only a flow through optical path between input and output ports and the switch fabrics 1610A and 1610B. Each of the I/O port modules 1963 and 1670 are deemed "passive" because they do not have an O/E/O in either their input path or their output path.

While other combinations of I/O port modules and (optical) switch fabrics can be formed, it is desirable to provide light signal regeneration by routing a light signal over an optical path through the optical cross-connect switching system so that at least one O/E/O conversion occurs to the light signal to increase the optical power level at the output from what was received at the input. The O/E/O conversion may used for other reasons as well which were previously described. If it is desirable, a signaling channel previously described between the optical cross connect switch and attached network or client equipment can be used to provide information regarding signal conditions and performance of and around the optical cross-connect switch. The signaling channel is particularly desirable if nothing but passive I/O port modules without O/E/Os are used in channels of the optical cross-connect switch.

The optical cross-connect switching system 1000 having redundant switch fabrics can readily provide self testability. The optical cross-connect switching system 1000 can optionally include a test port/monitor module 1605 in order to test the optical paths through the first and second switch fabrics 1610A and 1610B to perform sophisticated performance monitoring and attach test equipment if needed. One port of either switch fabric 1610A or 1610B can be dedicated as a test access port. The test port/monitor module 1605 is inserted into the dedicated test access port and monitors one of the split signals to determine if there is a failure in the optical path or not as well as to determine performance measures for the light signal including a bit error rate (BER). Any incoming light signal passing through the optical cross-connect 1000 can be accessed and monitored by switching one of the split signals over to the test access port where the test port/monitor module 1605 is present. The other part of the split signal continues to be routed through the optical cross-connect switching system 1000 unaffected. The test access port and test port/monitor module 1605 allow non-intrusive monitoring of the incoming light signals.

Figure 21:
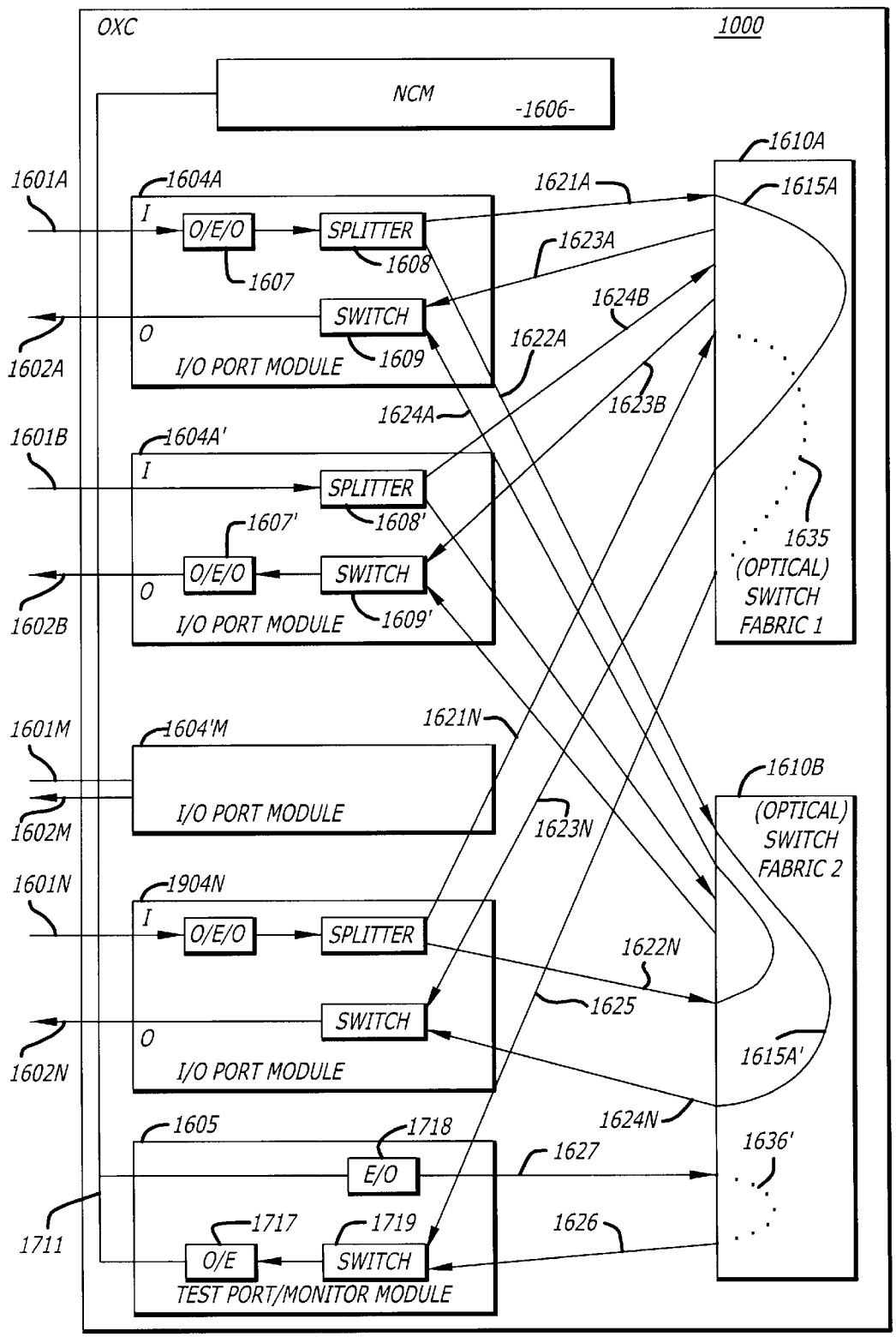
FIG. 21 is an exemplary embodiment of an optical cross-connect switching system utilizing a second type of test port/monitor module.

As shown in FIG. 21, the test port/monitor module 1705 includes an optical switch 1719 and an optical-to-electrical (O/E) converter 1717. The O/E 1717 couples to a controller (e.g., a NCM 1606) within the optical cross-connect 11000 via link 1711 in order to process the electrical signals from the test port/monitor module 1705 representing the light signal of the tested optical path. The optical switch 1717 selects between monitoring an optical path of the first switch fabric 1610A and an optical path of the second switch fabric 1610B. The switch fabric which is being monitored can be referred to as the "redundant switch fabric", while the switch fabric that is being used to carry data over the communication channel connection is referred to as the "active switch fabric". In FIG. 21, the second switch fabric 1610B is being monitored.

The test port selects a port to monitor to determine if a light signal is actually present on the split optical paths and if so, if the optical path carrying the data in the first switch fabric is reliable or has failed. The signals can also be monitored to determine what is the bit error rate through the optical cross-connect switching system 1000. The test port/monitor module 1605 or 1705 steps from path to path to sample the signals on the paths to determine where a failure may occur. The test port/monitor module 1605 or 1705 can use an algorithm such as a round robin algorithm to test each path in sequence. If a faulty path is detected, the test port/monitor module 1605 or 1705 raises an alarm and the information is sent to a network control module, for further fault isolation and servicing of the failure.

The test port/monitor module 1605 or 1705 can also ping-pong from one switch fabric to another in order to alternate the testing process. In FIG. 20A, the second optical switch fabric 1610B is being monitored by the optical path 1626 using a first test input port. Referring momentarily to FIG. 21, the first switch fabric 1610A is being monitored by the optical path 1625 using a second test input port as opposed to the second switch fabric 1610B to illustrate the ping-pong between switch fabrics 1610A and 1610B. Either of the test port/monitor module 1605 or 1705 can step from path to path to sample the signals over the optical paths to determine where a failure may occur. If a faulty optical path is detected, an alarm is signaled and it is removed from available paths in the respective switch fabric until its repaired or the redundant switch fabric is selected to replace the failing path.

Referring now to FIGS. 20A and 21, the test port/monitor module 1605 illustrated in FIG. 20A monitors incoming light signals for either switch fabric. The test port/monitor module 1705 illustrated in FIG. 21 can monitor incoming light signals from either switch fabric 1610A or 1610B as well as generate its own optical test signal to actively self-test optical paths through the either switch fabric. In addition to the O/E 1717 and the optical switch 1719, the test port/monitor module 1705 includes an electrical-to-optical (E/O) converter 1718 (e.g., a semiconductor laser) to generate a test light signal which is controlled to actively test optical paths through the first and second optical fabrics 1610A and 1610B. The test port/monitor modules 1605 or 1705 can be used in any configuration of an optical cross-connect switching system including the single and dual switch fabric embodiments disclosed herein.

Figure 22:
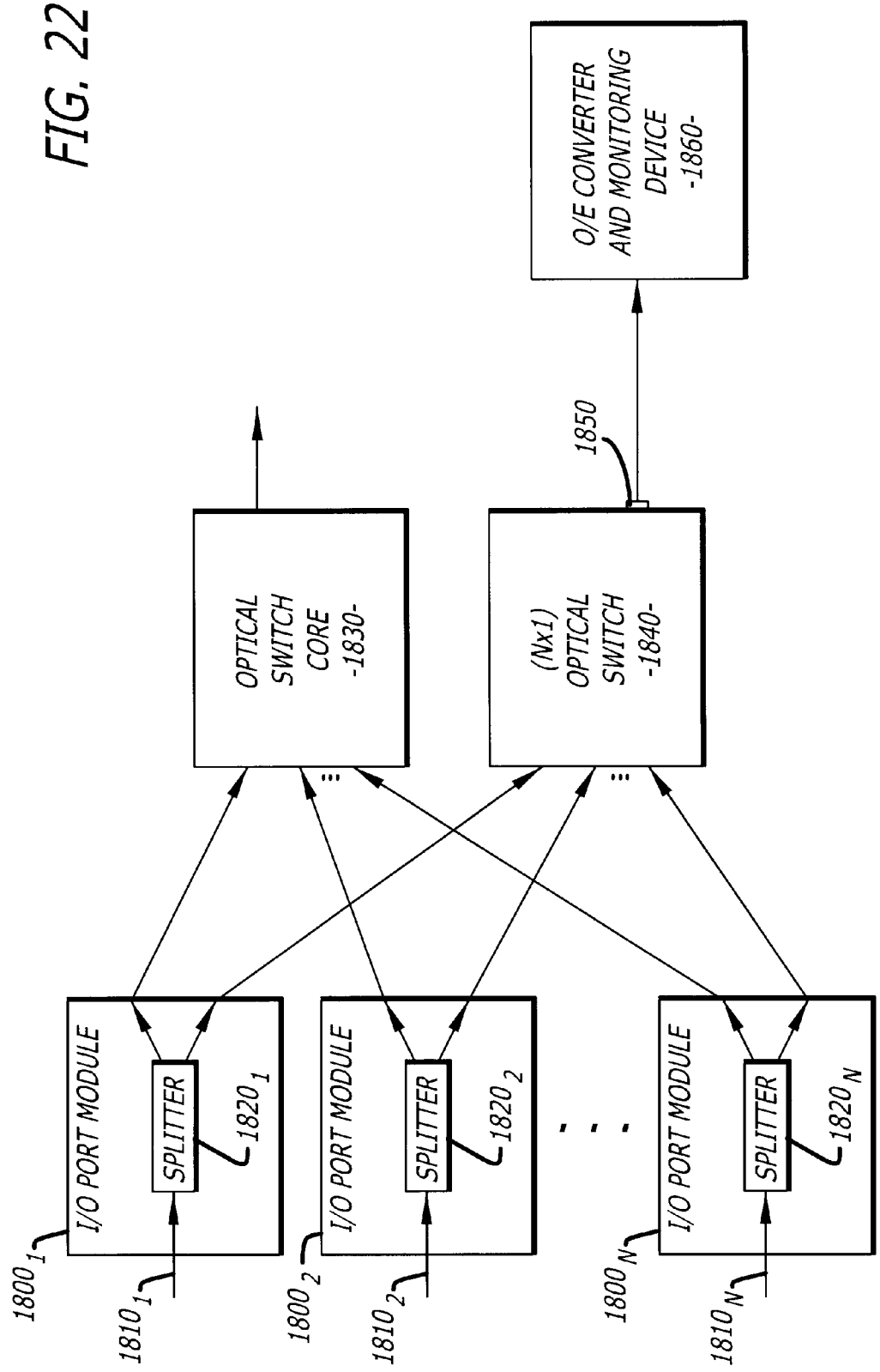
FIG. 22 is an exemplary embodiment for performance monitoring and topology discovery utilizing a test access port.

VIII. Detailed Overview of Performance Monitoring and Topology Discovery for the Cross-Connect Switching System Referring now to FIG. 22, an exemplary embodiment for performance monitoring and topology discovery utilizing a test access port is shown. Incoming light signals are routed over input paths $1810_1$–$1810_N$ to I/O ports associated with I/O port modules $1800_1$–$1800_N$ of the optical cross-connect switching system 1000. Upon receipt, the incoming light signals undergo a bridge operation by splitters $1820_1$–$1820_N$. Each splitter $1820_1, \ldots, 1820_N$ produces one bridged light signal to an optical switch core 1830 and another bridged light signal to an optical switch 1840. The optical switch 1840 includes N input ports and a single output port 1850 that is designated as the test access port. For example, the optical switch 1840 may be any N×1 switching device or an N×1 optical switch core with a single I/O port 1850 as the test access port.

An O/E converter and monitoring device 1860 (e.g., a test port/monitor module) may be coupled to the test access port 1850 to analyze light signals routed from any of the splitters $1820_1$–$1820_N$. For example, under normal operations, outgoing light signals are sent through the optical switch core 1830 and, at the optical switch 1840, each input I/O port is switched periodically to route its input light signal to the test access port 1850 for monitoring purposes. So, a single O/E converter and monitoring device 1860 can cycle among all the I/O ports and periodically monitor each one sequentially or randomly. The technique can be extended to support more than one test access port and multiple O/E converter and monitoring devices that cycle through the signal passing through the optical switch 1840.

The same technique can also be used for topology discovery. For example, each light signal passing through the optical cross-connect switching system 1000 is provisioned with an identifier (or a path trace). In particular, the light signal can be provisioned with an identifier by method of inserting a known byte or series of bytes in the light signal data stream. This identifier is provisioned in external equipment, e.g., the source of the data. It can also be encoded by low frequency modulation (sometimes referred to as "pilot tones") that ride on top of generic light paths (protocol of the data is not important in this case). This can be done by various methods, not excluding the optical cross-connect switching system itself. The optical cross-connect switching system can discover identifier information during monitoring by the servo module for instance. Once the information is read and discovered, the optical cross-connect switching system can report connectivity information for a portion of an optical network, commonly called topology discovery. Constant and or periodic monitoring for this type of information would constitute topology tracking. Detected using the monitoring scheme described above, the path trace can be used to enable the system to identify a set of connections within the network and track these connections.

IX. Detailed Overview of the Bridging Technique for the Optical Cross-Connect Switching System Referring now to FIGS. 23–27, exemplary embodiments of the bridging technique for redirecting signals to prevent against disruption of the optical path due to link or equipment failures is shown.

As shown in FIG. 23, a first exemplary embodiment of a low-loss bridging technique utilized by a first I/O port module 1900 is shown. In particular, a port 1905 of the I/O port module 1900 receives a light signal over link 1910 and subsequently routes the light signal to a splitter 1920. Herein, the splitter 1920 effectively performs a bridging operation to produce two bridged, outgoing light signals. Under normal operating conditions, a first outgoing light signal is associated with a substantial percentage of the power of the incoming light signal routed over link 1910. At the same time, a second outgoing light signal has a power level that is less than the first outgoing light signal but sufficient enough so that it can be monitored non-intrusively. For example, the splitter 1920 may split a light signal where the first outgoing light signal is associated with ninety percent (90%) of the power while the second outgoing light signal is associated with ten percent (10%) of the power. Of course, any disparate power levels may be used such as 80/20, 75/25 and the like.

All outgoing light signals are subsequently passed to a switch 1930 which routes the outgoing light signals over links 1940 and 1945 to different groups of optical switch cores 1950 and 1955. The optical switch cores 1950 and 1955 (e.g., a pair of micro-machine mirrors, etc.) route the first outgoing light signal over link 1960 to an optical switch 1970 within a second I/O port module 1980 while the second outgoing light signal is routed over link 1965 to the optical switch 1970. The optical switch 1970 is configured to select one of the outgoing light signals received over links 1960 and 1965 based on any number of light signal quality parameters. The non-selected outgoing light signal may be monitored non-intrusively for test access purposes via a test access port as described above.

Referring now to FIG. 24, upon detection of a failure of the optical switch core 1950, the switch 1930 is configured to re-route the first outgoing light signal over link 1945 and the second outgoing light signal over link 1940, respectively. This allows the first outgoing light signal to be routed to the optical switch 1970 via the second optical switch core 1955 that is fully operational.

Alternatively, as shown in FIGS. 25 and 26, it is contemplated that a two-state 1×2 switch 1990 may be utilized in lieu of the splitter 1920 and switch 1930 combination of FIGS. 23 and 24. Under normal operations, the switch 1990 may be configured to route an outgoing signal corresponding to a high percentage (e.g., P%, where P>50) of power from the incoming light signal to the first optical switch core 1950. A lower percentage (e.g., 100-P%) of power from the incoming light signal is routed to the second optical switch core 1955. Upon detection of a failure of the first optical switch core 1950, the switch 1990 is configured to re-route the first outgoing light signal over link 1945 and the second outgoing light signal over link 1940. This allows the first outgoing light signal to be routed to the optical switch 1970 via the second optical switch core 1955 that is fully operational.

Figure 27:
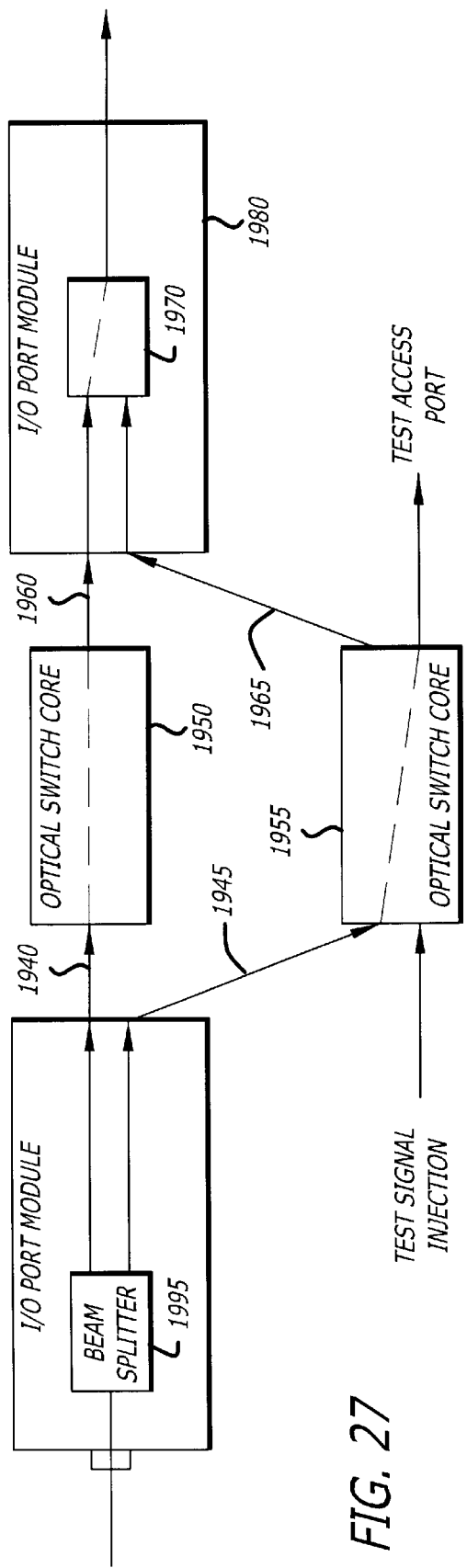
FIG. 27 is a third exemplary embodiment of a low-loss bridging technique utilized by a first I/O port module under normal operating conditions.

Alternatively, as shown in FIG. 27, it is contemplated that a polarization beam splitter 1995 may be utilized in lieu of the 1×2 switch of FIGS. 25 and 26. Under normal operations, the beam splitter 1995 splits an input light signal into two resultant light signals, a first resultant light signal having a first orthogonal state of polarization (e.g., horizontal) and a second resultant light signal having a second orthogonal state of polarization (e.g., vertical).

For example, the first orthogonal state of polarization is associated with a higher level of power than the second orthogonal state of polarization. Upon detection of a failure of the first optical switch core 1950, the beam splitter 1995 is configured to re-route the first resultant light signal having a first orthogonal state of polarization over link 1945 and the second outgoing light signal having a second orthogonal state of polarization over link 1940. This allows the first outgoing light signal to be routed to the optical switch 1970 via the second optical switch core 1955 that is fully operational.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention has been described in detail using an optical cross-connect switching system. However, the present invention may be implemented into other optical network equipment that accept optical data signals including an optical bridge, an optical router, an optical hub, an optical node, an optical concentrator, or other networking equipment accepting a data signal embodied in a light signal. Additionally, it is possible to implement the present invention or some of its features in hardware, firmware, software or a combination thereof where the software is provided in a processor readable storage medium such as a magnetic, optical, or semiconductor storage medium.

What is claimed is:

1. An input/output (I/O) port module comprising:
   a substrate; and
   a splitter mounted to the substrate, the splitter to receive an incoming light signal, produce a first bridged light signal and a second bridged light signal as a redundant light signal in order to increase reliability of information transmissions in an optical domain.

2. The I/O port module of claims 1, wherein the substrate is a printed circuit board including a first interface to receive the incoming light signal over an optical fiber link.

3. The I/O port module of claim 2 further comprising an optical switch to select one of the at least two light signals received over the second interface.

4. The I/O port module of claim 3 further comprising an optical-to-electrical converter to convert the one of the at least two light signals from an optical domain to an electrical domain for signal analysis.

5. The I/O port module of claim 4 further comprising an electrical-to-optical converter for injecting a test signal to actively test an optical path through a remotely located switch fabric.

6. The I/O port module of claim 1 further comprising a first tap coupler coupled to the splitter, the first tap coupler to separate the first bridged light signal into a first outgoing light signal and a first optical tap signal for use in monitoring a power level of the first outgoing light signal.

7. The I/O port module of claim 6, wherein the first outgoing light signal and the first optical tap signal produced by the first tap coupler have substantially disproportionate power levels.

8. The I/O port module of claim 6 further comprising a second tap coupler coupled to the splitter, the second tap coupler to separate the second bridged light signal into a second outgoing light signal and a second optical tap signal for use in monitoring a power level of the second outgoing light signal.

9. The I/O port module of claim 1, wherein the first bridged light signal and the second bridged light signal produced by the splitter have substantially equal power levels.

10. The I/O port module of claim 1, wherein the first bridged light signal and the second bridged light signal produced by the splitter have substantially disproportionate power levels.

11. A method comprising:
    receiving an incoming light signal having a predetermined power level; and
    performing a bridging operation by splitting the incoming light signal into at least a first outgoing light signal routed over a first optical data path and a second outgoing light signal routed over a second optical data path, the second outgoing light signal to monitor for disruption of the first optical data path.

12. The method of claim 11, wherein the first outgoing light signal and the second outgoing light signal have a collective power level substantially equal to the predetermined power level.

13. The method of claim 12, wherein the collective power level of the first outgoing light signal and the second outgoing light signal is equal to the predetermined power level minus a power loss caused by the splitting of the incoming light signal.

14. The method of claim 11, wherein the first outgoing light signal having a power level substantially greater than a power level of the second outgoing light signal.

15. The method of claim 14 further comprising:
    providing the second outgoing light signal to a multiple input optical switch; and
    selecting outputting a signal input into the multiple input optical switch for analysis by an optical-to-electrical conversion and monitoring device.

16. The method of claim 15 further comprising:
    selecting the second outgoing light signal for output from an optical switch of a destination I/O port module when the first optical path is disrupted.

* * * * *